US012335243B2

(12) United States Patent
Sethi et al.

(10) Patent No.: US 12,335,243 B2
(45) Date of Patent: Jun. 17, 2025

(54) METHOD AND SYSTEM FOR SECURE AND SYNCHRONOUS STORAGE AREA NETWORK (SAN) INFRASTRUCTURE TO SAN INFRASTRUCTURE DATA REPLICATION

(71) Applicant: Dell Products L.P., Round Rock, TX (US)

(72) Inventors: Parminder Singh Sethi, Ludhiana (IN); Anay Kishore, Bangalore (IN); Nithish Kn, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 18/173,949

(22) Filed: Feb. 24, 2023

(65) Prior Publication Data

US 2024/0291806 A1    Aug. 29, 2024

(51) Int. Cl.
*H04L 9/40* (2022.01)
*H04L 9/32* (2006.01)
*H04L 67/1097* (2022.01)

(52) U.S. Cl.
CPC .......... *H04L 63/0428* (2013.01); *H04L 9/321* (2013.01); *H04L 67/1097* (2013.01)

(58) Field of Classification Search
None
See application file for complete search history.

(56) References Cited

U.S. PATENT DOCUMENTS

| | | |
|---|---|---|
| 6,105,035 A | 8/2000 | Monge |
| 6,393,480 B1 | 5/2002 | Qin |
| 7,590,981 B2 | 9/2009 | Gupta et al. |
| 8,078,448 B1 | 12/2011 | Wohlberg et al. |
| 8,997,198 B1 * | 3/2015 | Kelley ............ G06F 21/335 726/4 |
| 9,015,832 B1 | 4/2015 | Lachwani et al. |
| 9,417,918 B2 | 8/2016 | Chin |

(Continued)

OTHER PUBLICATIONS

Achmadi, Dedy et al., On Developing Information Security Management System (isms) Framework for ISO 27001-based Data Center, Year: 2018 (9 pages).

*Primary Examiner* — Younes Naji
(74) *Attorney, Agent, or Firm* — Chamberlain, Hrdlicka, White, Williams & Aughtry; Aly Z. Dossa

(57) ABSTRACT

A method for managing a data replication operation includes: obtaining, by a first security module (FSM), UTC-based system time of a first storage area network (SAN) infrastructure; generating, by the FSM, a secure string based on the UTC-based system time and a configuration parameter set by a user of the first SAN infrastructure; encrypting, by the FSM, the secure string to generate an encrypted secure string; appending, by the FSM, the encrypted secure string to a data replication request to generate an encrypted secure string-appended request, sending, by the FSM, the encrypted secure string-appended request to a second SAN infrastructure; making, after intercepting the encrypted secure string-appended request and by a second security module (SSM), a determination that the encrypted secure string-appended request is valid; and initiating, by the SSM, the operation from the first SAN infrastructure to the second SAN infrastructure by sending a notification to the FSM.

19 Claims, 6 Drawing Sheets

(56) References Cited

U.S. PATENT DOCUMENTS

| | | |
|---|---|---|
| 9,514,164 B1 | 12/2016 | Matic |
| 10,303,465 B1 | 5/2019 | Potter |
| 10,691,820 B1 * | 6/2020 | Blum .................... H04L 63/107 |
| 10,713,134 B2 * | 7/2020 | Wang ...................... G06F 12/02 |
| 10,771,489 B1 | 9/2020 | Bisht et al. |
| 10,944,665 B1 | 3/2021 | Singh |
| 11,392,402 B1 | 7/2022 | Carroll |
| 11,630,735 B2 * | 4/2023 | Barajas Gonzalez ........................ G06F 11/1451 707/634 |
| 11,778,025 B1 * | 10/2023 | Kukreja ............... G06F 16/2393 709/238 |
| 2003/0233230 A1 | 12/2003 | Ammicht |
| 2005/0257090 A1 | 11/2005 | Santos |
| 2007/0198968 A1 | 8/2007 | Shenfield |
| 2010/0142447 A1 | 6/2010 | Schlicht |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0089711 A1 | 4/2012 | Zager |
| 2012/0151061 A1 | 6/2012 | Bartfai-walcott |
| 2012/0254849 A1 | 10/2012 | Wang |
| 2013/0346714 A1 | 12/2013 | Solihin |
| 2014/0172782 A1 | 6/2014 | Schuenzel |
| 2015/0169329 A1 | 6/2015 | Barrat |
| 2015/0222702 A1 | 8/2015 | Salle |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0266875 A1 | 9/2016 | Takahashi |
| 2017/0337088 A1 | 11/2017 | Wang |
| 2018/0004942 A1 | 1/2018 | Martin et al. |
| 2018/0113728 A1 | 4/2018 | Musani et al. |
| 2018/0157723 A1 | 6/2018 | Chougule |
| 2018/0322276 A1 | 11/2018 | Brown |
| 2019/0081959 A1 | 3/2019 | Yadav et al. |
| 2019/0104019 A1 | 4/2019 | Makovsky |
| 2019/0311041 A1 | 10/2019 | Shah |
| 2020/0156243 A1 | 5/2020 | Ghare et al. |
| 2020/0349238 A1 | 11/2020 | Tyagi |
| 2020/0351900 A1 | 11/2020 | Zhang |
| 2021/0200814 A1 | 7/2021 | Tal |
| 2021/0373947 A1 | 12/2021 | Kweon |
| 2022/0171856 A1 | 6/2022 | Bhatt |
| 2022/0385683 A1 | 12/2022 | Jones |

* cited by examiner

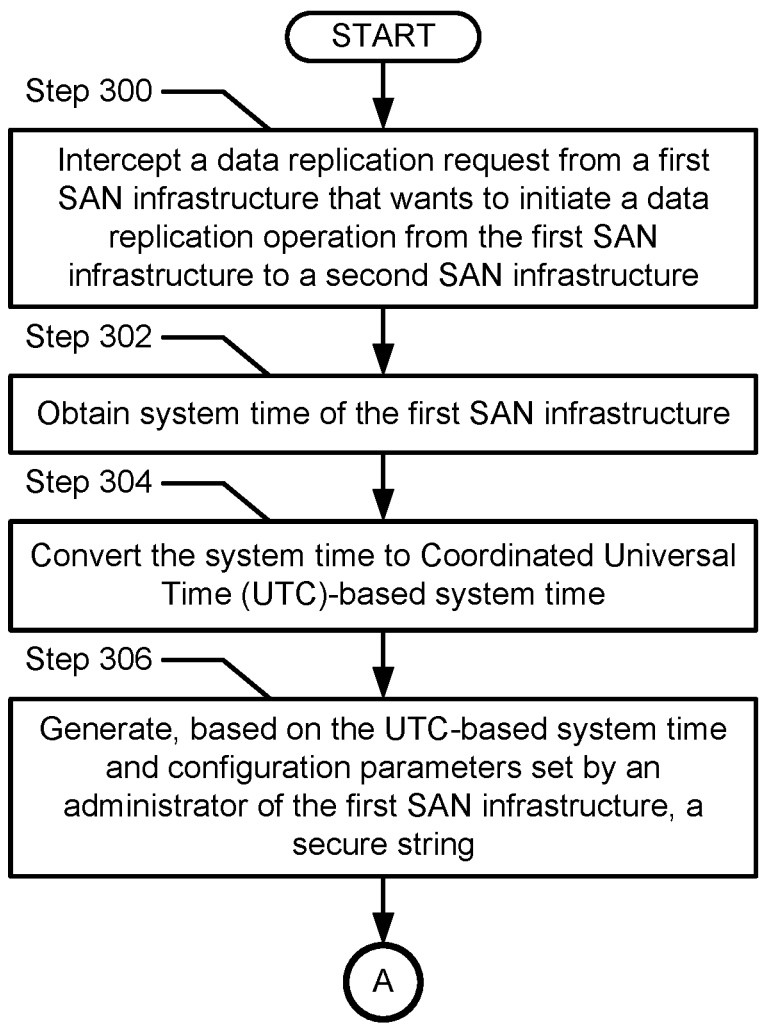
FIG. 3.1

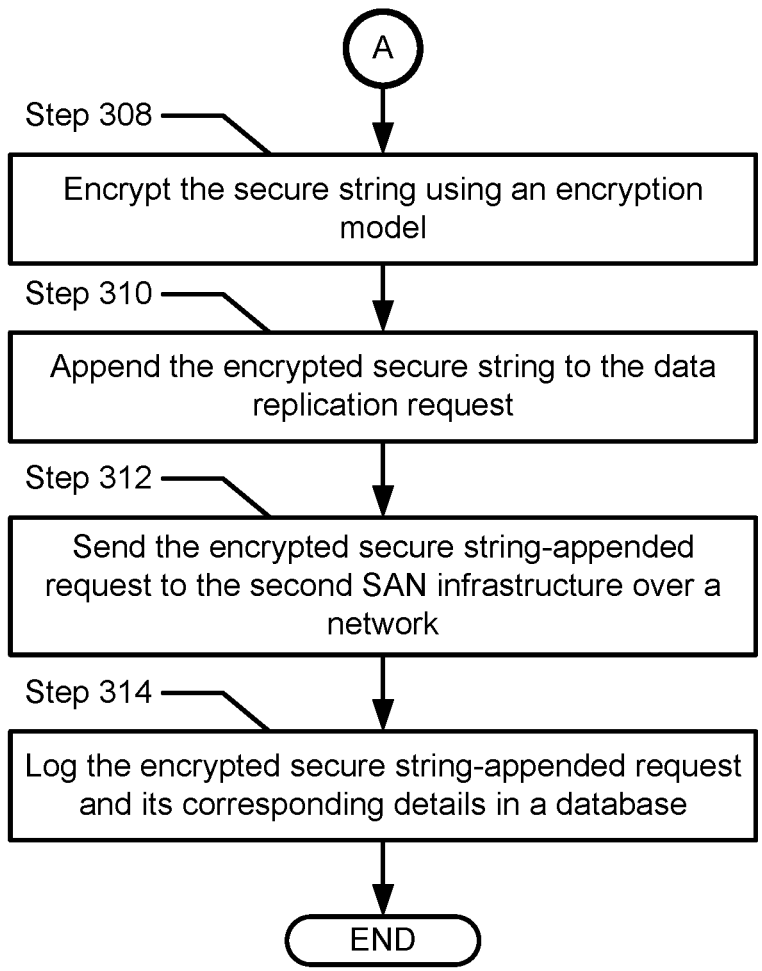
FIG. 3.2

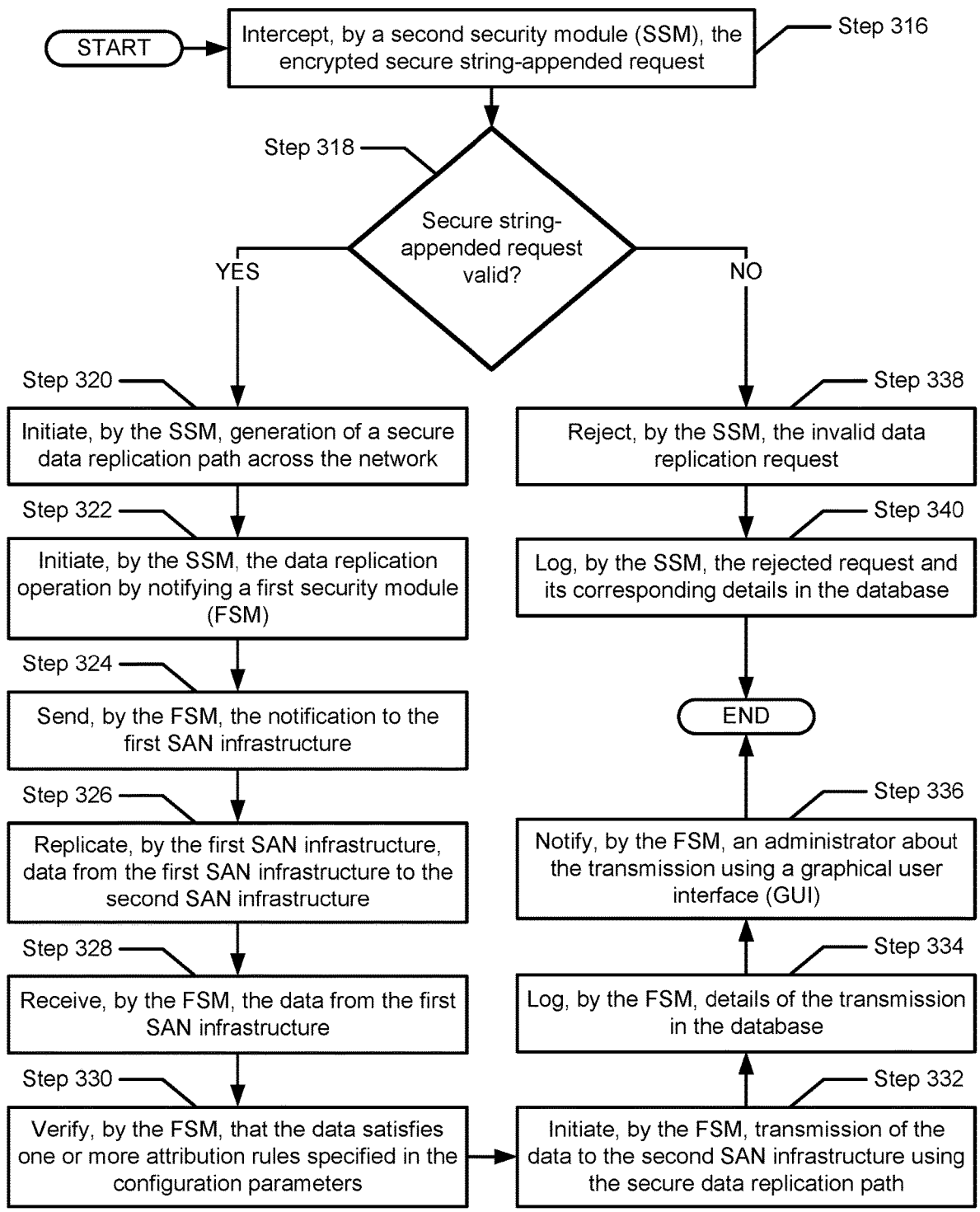
FIG. 3.3

METHOD AND SYSTEM FOR SECURE AND SYNCHRONOUS STORAGE AREA NETWORK (SAN) INFRASTRUCTURE TO SAN INFRASTRUCTURE DATA REPLICATION

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for secure and synchronous/asynchronous SAN infrastructure to SAN infrastructure data replication in accordance with one or more embodiments of the invention.

DETAILED DESCRIPTION

Figure 1:
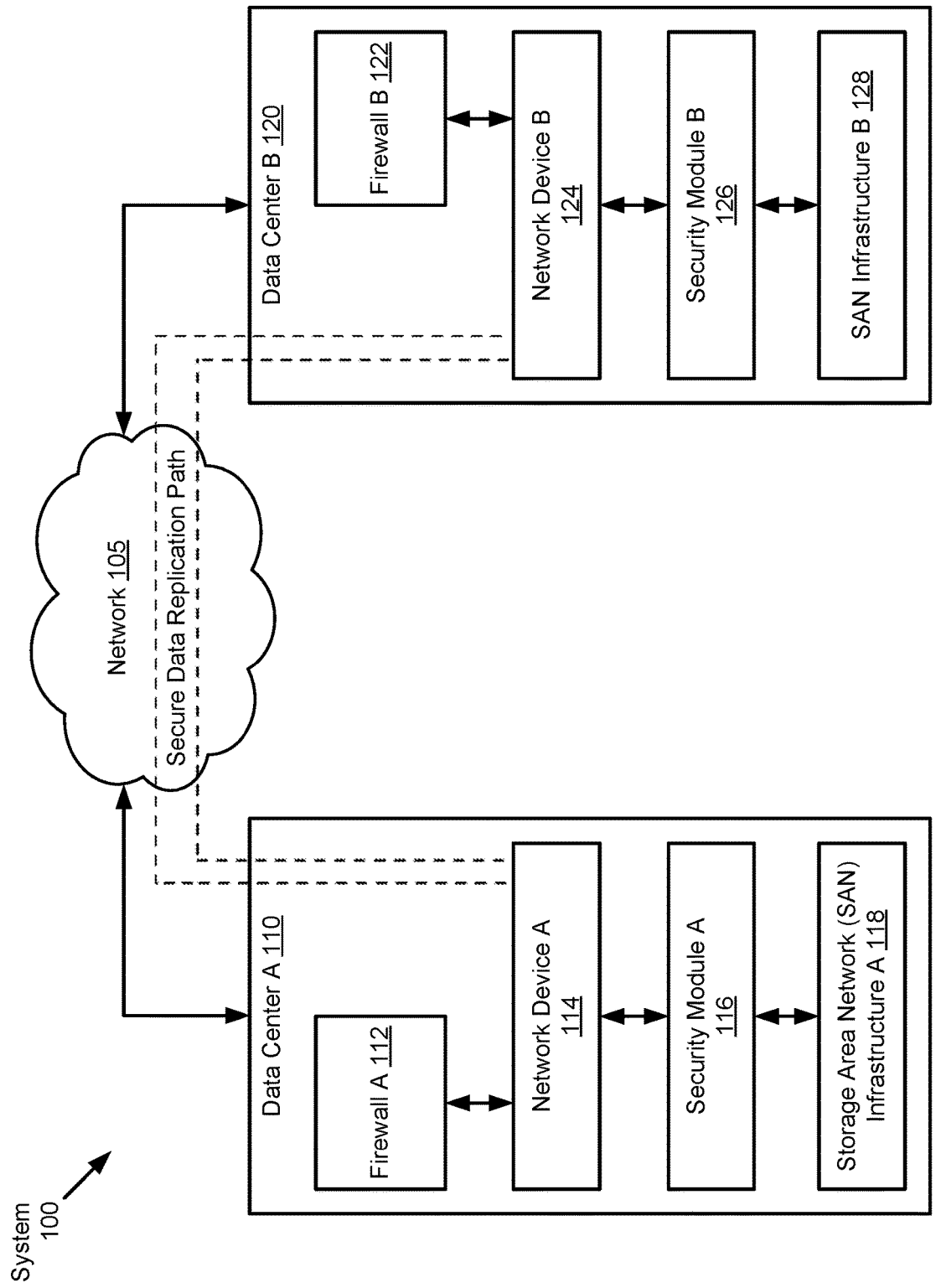
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a SAN infrastructure is utilized to store various different types of data (e.g., business-critical information, implementation details, information subject to government regulations, etc.) that an organization (e.g., a corporate) might need for, for example, developing long-term strategies. As organizations reaching out different geographical regions of the world with their diversified business models, the need for diversifying data centers of those organizations and applications executing on them arises. In most cases, geographically distributed data centers may need to operate synchronously so that there is no gap (or inconsistency) with respect to data available on different computing devices (e.g., clients, systems, etc.) that perform production workloads (e.g., reading data from assets, writing data to the assets, etc.) based on that data. While keeping data synchronized across those data centers, vendors (or administrators) of those data centers may also need to make sure that the process of data synchronization is efficient and secure (e.g., tamper-proof). In this manner, (i) any possible latency (for example, during a data retrieval operation) may be kept at the minimum level, and (ii) data integrity and availability may be kept at the maximum level.

As described above, organizations may have a business presence in various different continents, countries, and business industries (e.g., airline industry, medical industry, analytics industry, etc.) around the world and, thus, they need their data (e.g., application data, user data, etc.) to be always available in respective local computing systems for executing their operations with maximum efficiency. For this reason, with an increased need for data availability and integrity, the challenges related to keeping data secure and tamper-free are vital, and need to be resolved.

Embodiments of the invention relate to methods and systems (i) to provide an additional layer of security, (ii) to take one or more preventive (and proactive) actions, and (iii) to improve efficiency while performing synchronous or asynchronous SAN infrastructure to SAN infrastructure data replication operations between, for example, geographically distributed data centers. More specifically, the embodiments of the invention may first obtain, by a first security module (FSM), coordinated universal time (UTC)-based system time of a first SAN infrastructure. A secure string, by the FSM, may be generated based on the UTC-based system time and a configuration parameter set by a user of the first SAN infrastructure. The secure string, by the FSM, may then be encrypted to generate an encrypted secure string. Thereafter, the encrypted secure string may be appended to a data replication request to generate an encrypted secure string-appended request, in which the data replication request is received from the first SAN infrastructure.

Further, the encrypted secure string-appended request, by the FSM, may be sent to a second SAN infrastructure. After intercepting the encrypted secure string-appended request and by a second security module (SSM), a determination may be made that the encrypted secure string-appended request is valid. Finally, based on the determination and by the second SSM, a data replication operation may be initiated (e.g., instantiated, executed, etc.) from the first SAN infrastructure to the second SAN infrastructure by sending a notification to the FSM. As a result of the processes discussed below, one or more embodiments disclosed herein advantageously ensure that: (i) risks/threats (which are higher during data transmission and input validation(s)) that are posed to data centers (and all the related physical and/or logical components of those data centers) are prevented, (ii) a data replication operation (e.g., flow of data over a network) will not be initiated unless and until the corresponding security module (described below) validates the associated incoming request/call/network traffic (e.g., a data replication request, a data access request, etc.), authenticates the sender (e.g., a user, an external customer, a malicious actor, a developer, an administrator, an employee of an organization, etc.) of that request, and validates the target direction/destination of the operation, (iii) data integrity and availability (among all data centers of an organization) are being kept at the maximum level (with almost zero downtime on operations and/or interruption in services), and (iv) any possible latency is being kept at the minimum level to provide (a) an efficient and reliable, for example, data retrieval operation and/or data replication operation, and (b) a better user experience to one or more users of geographically distributed data centers (for example, of the same organization).

The following describes various embodiments of the invention.

FIG. 1 shows a diagram of a system (100) in accordance with one or more embodiments of the invention. The system (100) includes any number of clients (not shown), one or more data centers (e.g., Data Center A (110), Data Center B (120), etc.), and a network (105). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients, the data centers (110, 120), and the network (105) may be physical or logical devices, as discussed below. Data Center A (110) may be operably connected to Data Center B (120) via the network (105), in which the network (105) may allow Data Center A (110) (e.g., components of Data Center A (110)) to communicate with Data Center B (120) (e.g., components of Data Center B (120)). In one or more embodiments, Firewall A (112), Network Device A (114), Security Module A (116), and SAN infrastructure A (118) may collectively be referred to as "components of Data Center A (110)". Similarly, in one or more embodiments, Firewall B (122), Network Device B (124), Security Module B (126), and SAN infrastructure B (128) may collectively be referred to as "components of Data Center B (120)".

While FIG. 1 shows a specific configuration of the system (100), other configurations may be used without departing from the scope of the invention. For example, although Data Center A (110) and Data Center B (120) are shown to be operatively connected through the network (105), Data Center A (110) and Data Center B (120) may be directly connected, without an intervening network (e.g., 105).

Further, the functioning of Data Center A (110) and Data Center B (120) is not dependent upon the functioning and/or existence of the other components (e.g., devices) in the system (100). Rather, Data Center A (110) and Data Center B (120) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients. The system (100) may also represent a comprehensive middleware layer executing on computing devices (e.g., 400, FIG. 4) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), a data center (e.g., 110, 120, etc.) may be configured for hosting and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, a data center (e.g., 110) of an organization may exchange data with other data centers (e.g., 120) of the same organization registered in/to the network (105) in order to, for example, participate in a collaborative workload placement. As yet another example, a data center (e.g., 110) may split up a request (e.g., an operation, a task, an activity, etc.) with another data center (e.g., 120), coordinating its efforts to complete the request (e.g., to generate a response) more efficiently than if the data center (e.g., 110) had been responsible for completing the request. One of ordinary skill will appreciate that a data center (e.g., 110, 120, etc.) may perform other functionalities without departing from the scope of the invention.

In one or more embodiments, a data center (e.g., 110, 120, etc.) may be capable of providing the aforementioned functionalities/services to the user of the clients. However, not all of the users may be allowed to receive all of the services. For example, the priority (e.g., the user access level) of a user may be used to determine how to manage computing resources within a data center (e.g., 110, 120, etc.) to provide services to that user. As yet another example, the priority of a user may be used to identify the services that need to be provide to that user. As yet another example, the priority of a user may be used to determine how quickly communications (for the purposes of providing services in cooperation with the network (105) (and its subcomponents)) are to be processed by the network (105).

Further, consider a scenario where a first user is to be treated as a normal user (e.g., a user with a user access level of 4/10). In such a scenario, the user level of that user may indicate that certain ports (of the subcomponents of the network (105)) are to be opened, other ports are to be blocked, so that (i) certain services are to be provided to the user by the corresponding data center (e.g., 110, 120, etc.) and (ii) network traffic from that user is to be afforded a normal level of quality (e.g., a normal processing rate). In contrast, a second user may be determined to be a high priority user (e.g., a user with a user access level of 9/10). In such a case, the user level of that user may indicate that more ports are to be opened than were for the first user so that (i) the corresponding data center (e.g., 110, 120, etc.) may provide more services to the second user and (ii) network traffic from that user is to be afforded a high level of quality (e.g., a higher processing rate than the traffic from the normal user).

As used herein, "network traffic" is an amount of data moving across a network (e.g., 105) at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, network traffic may be characterized as either being northsouth or east-west, in which (i) north-south network traffic may be client-to-server network traffic that operates between a client and a server and (ii) east-west network traffic may be server-to-server network traffic that operates between servers within a data center.

In one or more embodiments, a data center (e.g., 110, 120, etc.) may include, for example (but not limited to): a router, a switch, a firewall, a security module, a SAN infrastructure, a server, an application-delivery controller, a network device, etc. A data center (e.g., 110, 120, etc.) may support business application and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

In one or more embodiments, the components (described above) of a data center (e.g., 110, 120, etc.) provide, at least, (i) network infrastructure (which connects servers (physical and/or virtualized), data center services, storage, and external connectivity to end-user locations (e.g., clients)), (ii) storage infrastructure (e.g., SAN infrastructure A (118)), and (iii) computing resources (e.g., processing, memory, local storage, network connectivity, etc.) that drive applications.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer (e.g., to determine) SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

As used herein, the term "backup" is intended to be broad in scope. In this manner, example backups in connection with which embodiments of the invention may be employed include (but not limited to): full backups, partial backups, clones, replications, snapshots, incremental backups, differential backups, etc.

As used herein, a "server" may be a physical computing device or a logical computing device (e.g., a VM) and may include functionality to: (i) provide computer-implemented services (e.g., receiving a request, sending a response to the request, etc.) to one or more entities (e.g., users, components of the system (100), etc.) and (ii) exchange data with other components registered in/to the network (105) in order to, for example, participate in a collaborative workload placement.

For example, a server may split up a request with another component of the system (e.g., 100, FIG. 1), coordinating its efforts to complete the request (e.g., to generate a response) more efficiently than if the server had been responsible for completing the request. In one or more embodiments, a request may be, for example (but not limited to): a web browser search request, a representational state transfer (REST) request, a computing request, a database management request, etc. To provide the computer-implemented services to the entities, the server (e.g., an enterprise server, a modular server, a blade server, a mainframe, a workstation computer, etc.) may perform computations locally and/or remotely. By doing so, the server may utilize different computing devices (e.g., 400, FIG. 4) that have different quantities of computing resources (e.g., processing cycles, memory, storage, etc.) to provide a consistent experience to the entities. In one or more embodiments, the server may be a heterogeneous set, including different types of hardware components and/or different types of OSs.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 400, FIG. 4), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments that embodiments of the invention may be employed include (but not limited to): Microsoft® Azure, Amazon® AWS, Dell® Cloud Storage Services, Google® Cloud, etc.

In one or more embodiments, a data center (e.g., 110, 120, etc.) may be a part of a business operation region (BOR) (not shown) of an organization, in which the BOR corresponds to a geographic region (e.g., a city, a county, a state, a province, a country, a country grouping (e.g., the European Union), etc.). For example, Data Center A (110) of Organization X may be located in the United States and Data Center B (120) of Organization X may be located in the Netherlands, in which Organization X has multiple geographically distributed data centers around the world.

In one architecture (e.g., the "unidirectional" architecture), one of the data centers (e.g., the parent data center) of an organization may be deployed to the United States, which serves (e.g., shares) data to/among the remaining data centers (e.g., the child data centers that are deployed to Argentina, India, and France) of the organization. In this architecture, the child data centers may transmit their data to the parent data center so that the parent data center is always updated. Thereafter, the parent data center may distribute/forward received data to the child data centers to keep the child data centers equally updated.

In another architecture (e.g., the "bidirectional" architecture), one of the data centers of an organization may be deployed to Greece and the other one may be deployed to Spain, in which both data centers know each other and when a data change is occurred in one of them, the other data center may automatically obtain that data to stay updated. Further, in another architecture (e.g., the "multidirectional" architecture), an organization may have multiple data centers deployed around the world and all of the data centers know each other. When one of the data centers is updated (e.g., when that data centers receives a software package), the remaining data centers are updated accordingly (e.g., by sending a data transfer request to each of the remaining data centers).

Figure 4:
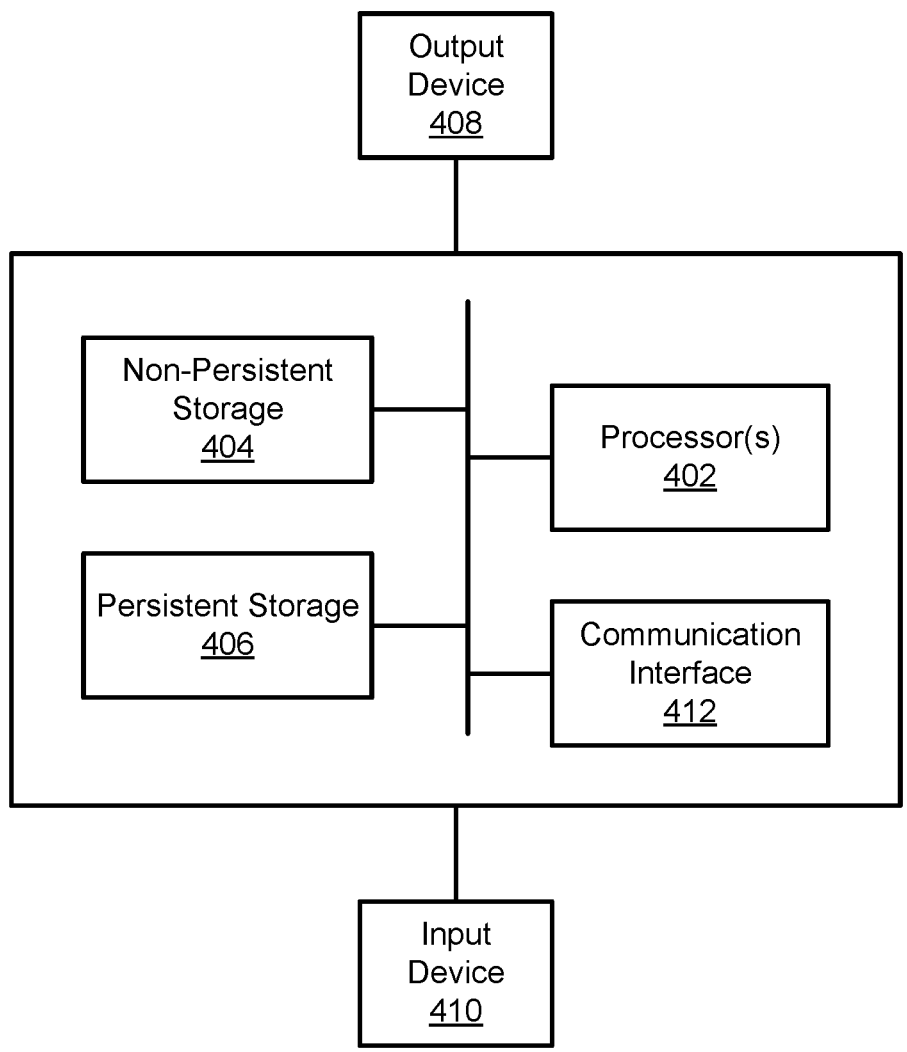
FIG. 4 shows a diagram of a computing device in accordance with one or more embodiments of the invention.

In one or more embodiments, a data center (e.g., 110, 120, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data center described throughout this application.

Alternatively, in one or more embodiments, the data center may be implemented as a logical device. The logical device may utilize the computing resources of any number of computing devices to provide the functionality of the data center described throughout this application.

In one or more embodiments, as described above, a data center (e.g., 110, 120, etc.) may include a firewall (e.g., Firewall A (112), Firewall B (122), etc.), a network device (e.g., Network Device A (114), Network Device A (124), etc.), one or more security modules (e.g., Security Module A (116), Security Module B (126), etc.), and a storage (e.g., SAN Infrastructure A (118), SAN Infrastructure B (128), etc.).

In one or more embodiments, a firewall (e.g., 112, 122, etc.) is a network monitoring/security component that monitors all incoming and outgoing network traffic (e.g., requests, responses, calls, etc.), in which it decides whether to allow or block specific network traffic based on a defined set of security rules. A firewall may be, for example (but not limited to): a hardware component, a software component, a software as-a-service (SaaS), a private cloud, etc. The aforementioned example is not intended to limit the scope of the invention.

A firewall (e.g., 112, 122, etc.) may include functionality to monitor (e.g., track) network traffic in the network (105) to obtain a dataset. In one or more embodiments, the dataset may include, for example (but not limited to): a request (e.g., an application programming interface (API) call), a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API (e.g., application data 1 and 2 are being used by API X to change locations of both data in the file system), a list of operations that is being done on application data (e.g., while renaming application data 2, API X encrypted application data 2; after encrypting, API X duplicated and modified application data 2), a usage level (e.g., 50 times in 1 hour, 10 times in 1 minute, etc.) of an application data by an API, a period of time within which application data is being used by an API, etc.

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, a request and a response to that request may be communicated over the network (105). In one or more embodiments, corresponding response time for a request may be a period of time, with a definite start and end, within which a response process is set to be completed.

In one or more embodiments, a firewall (e.g., 112, 122, etc.) may periodically obtain the dataset from the network traffic. The firewall may also obtain the dataset from the network traffic in real-time. The firewall may then store (temporarily or permanently) the dataset in a storage/memory resource (e.g., SAN infrastructure A (118), SAN infrastructure B (128), etc.) of the corresponding data center.

In one or more embodiments, a firewall (e.g., 112, 122, etc.) may also monitor the network traffic to determine, for example (but not limited to): availability of the network (105), unusual activities (e.g., exploitation events) on the network (105), etc. In most cases, an unusual activity on the network (105) may be a sign of a security issue (e.g., a malicious attack, distributed denial of service (DDoS) attack, malware attack, etc.). Because of the determined unusual activity, the firewall may notify an administrator (e.g., a network service provider (NSP)) of the network (105). Based on receiving the notification from the firewall, the NSP of the network (105) may reconfigure the network (105) to fix the security issue.

In one or more embodiments, because of increased network traffic, a firewall (e.g., 112, 122, etc.) may detect latency (e.g., delay) in the network (105). Because of the latency (e.g., 35 ms latency Quality of Service (QoS) network connection), the firewall may also notify the NSP. Based on receiving the notification from the firewall, the NSP may also reconfigure the network (105) to minimize the latency (e.g., the time it takes for data packets/packages to be transmitted, stored, or retrieved).

In one or more embodiments, the firewall may detect latency in the network traffic because of, for example (but not limited to): an increased amount of requests, an increased amount of responses, an increase in a size of a request, an increase in a size of a response, etc. One of ordinary skill will appreciate that a firewall (e.g., 112, 122, etc.) may perform other functionalities without departing from the scope of the invention.

In one or more embodiments, a firewall (e.g., 112, 122, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the firewall described throughout this application.

Alternatively, in one or more embodiments, similar to a data center (e.g., 110, 120, etc.), the firewall may also be implemented as a logical device.

In one or more embodiments, a network device (e.g., 114, 124, etc.) may be any type of network device (e.g., a switch, a router, etc.) that enables computing devices to communicate with other computing devices in a network environment. The network device (e.g., 114, 124, etc.) may include functionality to, e.g.: (i) use information (e.g., network use information, network configuration information that specify any number of configurations for a network device to provide its functionalities with a high configurability, etc.) included in a provided services repository (not shown) to determine how to provide/configure its respective services (for example, (a) the repository may specify identifiers of services and corresponding ports for the network device and (b) the repository may specify how to configure a network device at any level of granularity), (ii) based on a request received from a security module (e.g., 116, 126, etc.), generating a secure data replication path (e.g., a secure tunnel) across the network (105), (iii) perform any number and type of communications schemes (e.g., Internet protocol (IP) communications, Ethernet communications, etc.), (iv) being configured by other computing devices, and (v) limiting communications on a granular level (e.g., on a per port level, on a per sending device level, etc.) via filtering or other methodology.

In one or more embodiments, the provided services repository may be maintained by, for example, a SAN infrastructure (e.g., 118, 128, etc.). The SAN infrastructure may add, remove, and/or modify information included in the provided services repository. The SAN infrastructure may do so based on information or a request/call obtained from administrators, other data structures, and/or from other sources (e.g., a security module (e.g., 116, 126, etc.)). The data structures of the provided services repository may be implemented using, for example, lists, tables, unstructured data, databases, etc. While described as being stored locally, the provided services repository may be stored remotely and may be distributed across any number of devices without departing from the invention.

In one or more embodiments, the network device (e.g., 114, 124, etc.) may provide compression of network traffic at any level of a network stack or at any protocol (or network layer). The network device may also provide transport layer protocol optimizations (e.g., transport control protocol (TCP) optimizations), flow control, performance, modifications and/or management to accelerate delivery of applications and data, for example, (i) over a wide area network (WAN) connection, (ii) for any session, or (iii) for any application layer.

In one or more embodiments, the network device (e.g., 114, 124, etc.) may act as any type and form of transport control protocol or transport layer terminating device, such as a gateway or a firewall. For example, a network device (e.g., 114) may terminate a transport control protocol by establishing a transport control protocol connection with a second network device (e.g., 124). As yet another example, a network device (e.g., 114) may terminate a transport control protocol by managing the behavior of the transport control protocol connection between the network device (e.g., 114) and a second network device (e.g., 124), in which the network device (e.g., 114) may change, queue, or transmit network packets to effectively terminate the transport control protocol connection.

In one or more embodiments, the network devices (e.g., 114, 124, etc.) may, at least, (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) set up efficient and secure connections (e.g., a virtual private network (VPN) connection (or a trust relationship), a secure socket layer VPN (SSL VPN) connection, an IP security (IPSec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and (v) in some cases, enable users to bypass firewalls (e.g., provide endpoint-to-endpoint connections across a hybrid network without opening firewall rules in an enterprise network). To this end, the network device (e.g., 114, 124, etc.) may include any logic, functions, rules, or operations to perform services or functionalities (for communications between Data Center A (110) and Data Center B (120)) such as, for example, SSL VPN connectivity, SSL offloading, switching/load balancing, hypertext transfer protocol secure (HTTPS)-encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling, TCP multiplexing, TCP buffering, caching, etc.).

As used herein, in networking, "tunneling" is a way for transporting data across a network (e.g., 105) using protocols (standardized set of rules for (i) formatting and processing data, and (ii) enabling computing devices to communicate with one another) that are not supported by that network. In general, a "secure tunnel" refers to a group of microservices that includes, for example (but not limited to): a user interface (UI) server service, an API server service, a controller service, a tunnel connection service, an application mapping service, etc.

Tunneling works by encapsulating packets (packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, where the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

In one or more embodiments, the network devices (e.g., 114, 124, etc.) may provide, for example, a TLS VPN connection between Data Center A (110) and Data Center B (120). For example, Security Module B (126) may request (e.g., initiate) generation (e.g., establishment) of an end-to-end secure tunnel (e.g., a TLS VPN connection) from Data Center B (120) to Data Center A (110) over the network (105). Once the secure tunnel is generated: (i) Network Device A (114) may receive one or more data packets (that are intercepted by Security Module A (116)), (ii) Network Device A (114) may encrypt the data packets and transmit them to Network Device B (124) via the secure tunnel, (iii) after receiving the data packets, Network Device B (124) may decrypt the data packets and transmit them to Security Module B (126), (iv) if the data packets satisfy one or more attribution rules specified in configuration parameters (described below in reference to FIG. 2), Security Module B (126) sends them to SAN Infrastructure B (128), and (v) Network Device A (114) and Network Device B (124) may then effectively terminates the secure tunnel by managing the behavior of the secure tunnel (e.g., the TCP connection) between Data Center A (110) and Data Center B (120).

In one or more embodiments, the network devices (e.g., 114, 124, etc.) may include an encryption/decryption engine (not shown) providing logic, business rules, functions, or operations for handling the processing of any security related protocol (e.g., the SSL protocol, the TLS protocol, etc.) or any function related thereto. For example, the encryption/decryption engine may encrypt and/or decrypt data packets (based on executable instructions running on an encryption/decryption processor), or any portion thereof, communicated via the network devices (e.g., 114, 124, etc.). The encryption/decryption engine may also establish secure tunnel connections on behalf of the network devices (e.g., 114, 124, etc.). In one or more embodiments, the network devices (e.g., 114, 124, etc.) may also include a network optimization engine (not shown) for optimizing, accelerating, or otherwise improving the performance, operation, or quality of any network traffic (or communications) traversing the network devices.

In one or more embodiments, the network devices (e.g., 114, 124, etc.) has one or more ports (e.g., port 443, port 1521, port 8881, etc.) for transmitting and receiving data packets over a secure tunnel (or over the network (105)). The ports may provide a physical and/or logical interface between the network devices (e.g., 114, 124, etc.) and the network (105) (or another computing device for transmitting and receiving network communications). In one or more embodiments, the type and form of a port may depend on (i) the type and form of the network (105) and (ii) the type of medium for connecting to the network (105).

As used herein, a "port" is a number representing communication endpoints in computer networking. A port is an unsigned 16-bit integer (0-65535) that identifies a specific process or a network service. In most cases, a port may employ a TCP or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP may be used in combination with IP and it facilitates a transmission of datagrams from one application to another application. However, unlike the TCP, the UDP does not guarantee a reliable communication. This means that it is up to the application (that received the message) to process any errors and verify the delivery.

In one or more embodiments, the network devices (e.g., 114, 124, etc.) may be deployed based on (i) an "in-line of traffic" configuration or (ii) a "virtual in-line mode" configuration. In one or more embodiments, the network devices (e.g., 114, 124, etc.) may be deployed in-line (or in parallel) to one or more of the following: a router, a security module, a server, or another network device. Further, the network devices (e.g., 114, 124, etc.) may be deployed based on the virtual in-line mode configuration. In this configuration, a router (or a network device with routing or switching functionality) is configured to forward, re-route, or otherwise provide data packets (e.g., network packets) destined to a network device (e.g., 114, 124, etc.).

The network device (e.g., 114, 124, etc.) may then perform any desired processing on the data packets, such as any of WAN optimization techniques. Upon completion of processing, the network device (e.g., 114, 124, etc.) may forward the processed data packets to the router to transmit to the destination over the network (105). By this way, the network device (e.g., 114, 124, etc.) may be coupled to the router in parallel but still operate as it if the network device (e.g., 114, 124, etc.) were in-line. This deployment configuration may also provide transparency in the source and destination addresses, and port information are preserved as the data packets are processed and transmitted via the network device (e.g., 114, 124, etc.) through the network (105).

In one or more embodiments, the network devices (e.g., 114, 124, etc.) may be implemented using any combination of wired and/or wireless network topologies. The network devices (e.g., 114, 124, etc.) may employ any number and types of communications to enable Data Center A (110) and Data Center B (120) to communicate with each other. Further, the network devices (e.g., 114, 124, etc.) may be configured to perform all, or a portion, of the functionality described in FIGS. 3.2 and 3.3.

In one or more embodiments, a network device (e.g., 114, 124, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network device described throughout this application.

Alternatively, in one or more embodiments, similar to a data center (e.g., 110, 120, etc.), the network device may also be implemented as a logical device.

In one or more embodiments, because the components (described above and below) of a data center (e.g., 110, 120, etc.) store and manage business-critical data and applications (e.g., services), data center security is one of the key aspects while designing a data center. To achieve this, as an additional, active, standby, and reliable security layer, a security module (e.g., 116, 126, etc.) may be deployed between (or disposed between) a firewall (e.g., 112, 122, etc.) and other components of the corresponding data center (e.g., 110, 120, etc.) so that, for example, (i) each component behind the security module may remain intact, and (ii) business-critical data and services and their disaster recovery mechanisms may not directly exposed to the network (105) (because, in general, most of database applications and/or web services provided by a data center are directly exposed to a network with the protection of a single firewall layer, and in case of any attack or disaster, the data center may be vulnerable to direct attacks or impacts).

In one or more embodiments, each data center (e.g., 110, 120, etc.) may include one or more security modules (e.g., 116, 126, etc.) that execute independently from a firewall (e.g., 112, 122, etc.) of the corresponding data center. More specifically, one instance of a security module (e.g., 116, 126, etc.) may be deployed to each data center, for example, of an organization.

In one or more embodiments, as being a lightweight multi-site application executing in each site of an organization, the organization may easily configure, deliver, and manage each security module (e.g., 116, 126, etc.) across, for example, multiple cloud environments for high availability and reliability. Further, each security module (e.g., 116, 126, etc.) may provide, for example (but not limited to): global load balancing, site failover, network traffic management across an organization's multiple data centers and public cloud provider networks, etc. In order to provide the aforementioned functionalities, each security module (e.g., 116, 126, etc.) may (i) monitor the health, availability, and latency for each site, and (ii) perform one or more policies that have been configured around regulatory requirements.

In one or more embodiments, each security module (e.g., 116, 126, etc.) may also, for example (but not limited to): ensure multi-site resiliency and disaster recovery (e.g., a security module (e.g., 116, 126, etc.) may redirect network traffic to the closest or best performing data center, or to healthy data centers if there is an outage), improve data center performance and availability (for example, if network traffic is not distributed appropriately across data centers, one site might become oversubscribed while another is underutilized, and with its network traffic management functionality, a security module may ensure that the load is balanced more evenly across sites for an optimal user experience), improve scalability and agility of data centers, implement load balancing and reduce latency in data centers (by ensuring that no single data center is overloaded with too many valid requests), satisfy regulatory and security requirements (e.g., configuration parameters), etc.

One of ordinary skill will appreciate that a security module (e.g., 116, 126, etc.) may perform other functionalities without departing from the scope of the invention. In one or more embodiments, a security module (e.g., 116, 126, etc.) may be configured to perform all, or a portion, of the functionalities described in FIGS. 3.1-3.3. Additional details about the security module are described below in reference to FIG. 2.

In one or more embodiments, a security module (e.g., 116, 126, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the security module described throughout this application.

Alternatively, in one or more embodiments, similar to a data center (e.g., 110, 120, etc.), the security module may also be implemented as a logical device.

In one or more embodiments, a SAN infrastructure (e.g., 118, 128, etc.) is a specialized, high-speed network that provides high-performance and low-latency network access to storage devices (e.g., a networked storage solution). In one or more embodiments, the SAN infrastructure (e.g., 118, 128, etc.) may include, for example, one or more hosts (e.g., a SAN metadata server, a SAN data replication server, a SAN management server, etc.), one or more switches (e.g., a Fibre Channel (FC) switch, an Ethernet switch, an Infini-Band switch, etc.), one or more gateways (to move data between different SAN infrastructures), and one or more storage devices (e.g., redundant array of independent disks (RAID), a storage pool, a virtual storage resource for access by a remotely located computing device, etc.) that are interconnected using a variety of technologies, interfaces, topologies, and protocols (e.g., FC, Internet small computer systems interface (iSCSI), SCSI, nonvolatile memory express (NVMe), Fibre Connection (FICON), Fibre Channel over Ethernet (FCoE), remote direct memory access (RDMA), secure remote password (SRP), etc.).

In one or more embodiments, through different types of virtualization, the SAN infrastructure (e.g., 118, 128, etc.) may present storage devices to a host such that the storage devices appear to be locally attached. More specifically, storage traffic over, for example, FC avoids TCP/IP packetization and latency issues, as well as any LAN congestion, ensuring the highest simultaneous access speed available for media and mission critical stored data. Further, the SAN infrastructure (e.g., 118, 128, etc.) may be used to, for example (but not limited to): improve application (and/or data) availability (e.g., via multiple data paths, via internal fallback (e.g., hardware redundancy) mechanisms, etc.), enhance application performance (e.g., via off-load storage functions, segregate networks, etc.), increase storage utilization and effectiveness (e.g., by consolidating storage resources, providing tiered storage, etc.), etc.

In one or more embodiments, a storage device (e.g., a device to store data and provide access to stored data) of the SAN infrastructure (e.g., 118, 128, etc.) may store unstructured and/or structured data that may include, for example (but not limited to): an identifier, an alias, a serial number, a vendor name or identifier, a model identifier, an identification of at least one capability, an identification of an available functionality, an identification of a resource provided by a storage device, a data center identifier, a storage device identifier, an access control list (ACL), a type of a data center, a size of a data center, an amount of space used in a data center, an amount of space available in a data center, information associated with redundancy features, a storage pool identifier, a parent storage pool identifier, a size of a storage pool, an amount of space used in a storage pool, an amount of space available in a storage pool, information associated with the types of provisioning functionality availability, default configuration data of a storage device, status data of a storage device, etc.

As used herein, a "switch fabric" is an interconnected network of switching devices that may include one or more input and output ports for communicating with a switch in a network of switching devices. As an interconnect architecture (e.g., a combination of hardware and software components), a switch fabric may (i) redirect data within a system (e.g., the SAN infrastructure (e.g., 118, 128, etc.)) from one of the ports in a line card to another port in a different line card and (ii) dynamically modify ACLs to include identifications of VMs, host computing devices, and/or network ports authorized to access a storage device. Further, a switch fabric may be a heterogeneous device, including switches that communicate based on the aforementioned protocols.

In one or more embodiments, the SAN infrastructure (e.g., 118, 128, etc.) may provide data protection (e.g., data backup, data replication, data management, data restore, etc.) services to the clients (or any other component of the system (100)). The data protection services may initiate generation and storage of backups (e.g., block-based backups, file-based backups, etc.) in the SAN infrastructure (e.g., 118, 128, etc.). The data protection services may also include restoration of the clients (or any other component of the system (100)) to a restoration host (not shown) using the backups stored (temporarily or permanently) in the SAN infrastructure (e.g., 118, 128, etc.).

More specifically, the SAN infrastructure (e.g., 118, 128, etc.) may provide data protection services to the clients (or any other component of the system (100)) by orchestrating (or scheduling): (i) generation of backups of the clients, (ii) storage of the generated backups of the clients, (iii) consolidation of one or more backup requests to reduce (or to prevent) generation of backups that are not useful for restoration purposes, and (iv) restoration of the clients to previous states using backups stored in the SAN infrastructure (e.g., 118, 128, etc.). Further, to provide the aforementioned services, the SAN infrastructure (e.g., 118, 128, etc.) may include functionality to generate and issue instructions to any other component of the system (100). The SAN infrastructure (e.g., 118, 128, etc.) may also generate instructions in response to data protection requests from other entities.

In one or more embodiments, the SAN infrastructure (e.g., 118, 128, etc.) may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, while performing one or more operations requested by a user (or an administrator) of the corresponding data center (e.g., 110, 120, etc.), the SAN infrastructure (e.g., 118, 128, etc.) may include functionality to request and use resources (e.g., data, computing resources, etc.) available in the corresponding data center (e.g., 110, 120, etc.). Additional details about the resources (e.g., processing resources, networking resources, etc.) are described below. In one or more embodiments, the administrator may be a user with permission (e.g., a user that has root-level access) to make changes on a data center (e.g., 110, 120, etc.) that will affect other users of that data center (e.g., 110, 120, etc.).

In one or more embodiments, in order to provide the above-mentioned functionalities, the SAN infrastructure (e.g., 118, 128, etc.) may need to communicate with other components of the corresponding data center (e.g., 110, 120, etc.) with minimum amount of latency (e.g., with high-throughput (e.g., a high data transfer rate) and sub-millisecond latency). For this reason, REST APIs may be used to enable communication(s) between the SAN infrastructure (e.g., 118, 128, etc.) and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, a SAN infrastructure (e.g., 118, 128, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the SAN infrastructure described throughout this application.

Alternatively, in one or more embodiments, similar to a data center (e.g., 110, 120, etc.), the SAN infrastructure may also be implemented as a logical device.

While a SAN infrastructure (e.g., 118, 128, etc.) has been illustrated and described as including a limited quantity and type of data, a SAN infrastructure (e.g., 118, 128, etc.) in accordance with embodiments of the invention may store additional, less, and/or different data without departing from the scope of the invention.

In one or more embodiments, the network (105) may represent a computing network configured for computing resource and/or messages exchange among registered computing hosts (e.g., Data Center A (110), Data Center B (120), etc.). As discussed above, components of the system (100) may operatively connect to one another through the network (105) (e.g., a LAN, a WAN, a mobile network, a wireless LAN (WLAN), etc.). In one or more embodiments, the network (105) may be implemented using any combination of wired and/or wireless network topologies, and the network (105) may be operably connected to the Internet or other networks. Further, the network (105) may enable interactions between Data Center A (110) and Data Center B (120) through any number and types of wired and/or wireless network protocols (e.g., TCP, UDP, Internet Protocol version 4 (IPv4), etc.). Further, the network (105) may be configured to perform all, or a portion, of the functionality described in FIGS. 3.2 and 3.3.

The network (105) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more components (e.g., Network Device A (114), Network Device B (124), etc.) in the network (105), and (iii) limiting communication(s) on a granular level (e.g., on a per-port level, on a per-sending device level, etc.).

In one or more embodiments, before communicating data over the network (105), the data may first be broken into smaller batches (e.g., data packets) so that larger size data can be communicated efficiently. For this reason, the network-enabled subcomponents may break data into data packets. The network-enabled subcomponents may then route each data packet in the network (105) to distribute network traffic uniformly.

In one or more embodiments, the network-enabled subcomponents may decide how real-time (e.g., on the order of milliseconds or less) network traffic and non-real-time network traffic should be managed in the network (105). In one or more embodiments, the real-time network traffic may be high priority (e.g., urgent, immediate, etc.) network traffic. For this reason, data packets of the real-time network traffic may need to be prioritized in the network (105). The real-time network traffic may include data packets related to, for example (but not limited to): videoconferencing, web browsing, voice over Internet Protocol (VoIP), etc.

In one or more embodiments, the non-real-time network traffic may be low priority (e.g., non-urgent) network traffic. For this reason, data packets of the non-real-time network traffic may not need to be prioritized in the network (105). The non-real-time network traffic may include data packets related to, for example (but not limited to): File Transfer Protocol (FTP) for web publishing, email applications, etc.

In one or more embodiments, clients may be physical or logical computing devices configured for hosting one or more workloads and/or for providing computing environments whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients). In one or more embodiments, the clients may correspond to computing devices (located on the other side of the network (105)) that one or more users (discussed below) use to interact with one or more components of the system (100).

In one or more embodiments, the clients may include any number of applications (and/or content accessible through the applications) that provide computer-implemented application services to the users. Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide the aforementioned application services, each application may host similar or different components. The components may be, for example (but not limited to): instances of databases, instances of email servers, etc. Applications may be executed on the clients as instances of an application.

Further, applications may vary in different embodiments, but in certain embodiments, applications may be custom developed or commercial (e.g., off-the-shelf) applications that a user desires to execute in a client. In one or more embodiments, applications (e.g., a word processor, a media player, a web browser, a file viewer, an image editor, etc.) may be (i) designed and configured to perform one or more functions instantiated by a user and (ii) logical entities executed using computing resources of a client. For example, applications may be implemented as computer instructions, e.g., computer code, stored on persistent storage of a client that when executed by the processor(s) of the client cause the client to provide the functionality of the applications described throughout the application.

In one or more embodiments, while performing, for example, one or more operations requested by a user, applications installed on a client may include functionality to request and use physical and/or logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of a client.

In one or more embodiments, the clients may issue requests to the data centers (e.g., 110, 120, etc.) to receive responses and interact with various components of those data centers (e.g., 110, 120, etc.). The clients may also request data from and/or send data to the data centers (e.g., 110, 120, etc.). Further, the clients may initiate an application to execute on the data centers (e.g., 110, 120, etc.) such that the application may (itself) gather, transmit, and/or otherwise manipulate data located in the data centers (e.g., 110, 120, etc.), remote to the clients. In one or more embodiments, the clients may share access to more than one data center and may similarly share any data located in those data centers.

In one or more embodiments, when a client interacts with a data center (e.g., 110, 120, etc.), data that is relevant to the client may be stored (temporarily or permanently) in that data center (e.g., 110, 120, etc.). For example, consider a scenario in which SAN infrastructure A (118) hosts a database utilized by the clients. In this scenario, the database may be a client database associated with users of the clients. When a new user is identified, SAN infrastructure A (118) may add information of the new user to the client database. By doing so, data that is relevant to the clients may be stored in SAN infrastructure A (118). This may be done because an administrator of SAN infrastructure A (118) may desire access to the information of the new user at some point-in-time.

As yet another example, a client may execute an application that interacts with an application database hosted by Data Center B (120). When an application upgrade is available to fix a critical software issue, Data Center B (120) may identify the client that requires the application upgrade. The application database may then provide the application upgrade to the client. By doing so, the application executed by the client may be kept up-to-date. As yet another example, a client may send instructions to Data Center A (110) to configure one or more VMs hosted by Data Center A (110). In one or more embodiments, instructions may be, for example (but not limited to): instructions to configure a backup policy, instructions to take a snapshot of VM data, etc. The clients may perform other types of functionalities not listed above without departing from the scope of the invention.

In one or more embodiments, the clients may provide computer-implemented services to users (and/or other computing devices such as, other clients or other types of devices). The clients may provide any number and any type of computer-implemented services (e.g., data storage services, electronic communication services, etc.). To provide computer-implemented services, each client may include a collection of physical components (e.g., processing resources, storage/memory resources, networking resources, etc.) configured to perform operations of the client and/or otherwise execute a collection of logical components (e.g., applications, virtualization resources, etc.) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client. The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client).

In one or more embodiments, a client may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while applications provide computer-implemented services to the clients, the applications may store data that may be relevant to the clients to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients may enter into agreements (e.g., SLAs) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client with external entities (e.g., other clients, data centers (e.g., 110, 120, etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

In one or more embodiments, a networking resource may implement and/or support the above-mentioned protocols to enable the communication between the client and external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an IP address) to be used when utilizing the above-mentioned protocols.

Further, a networking resource, when using a certain protocol or a variant thereof, may support streamlined access to storage/memory media of other clients. For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client. The VM (and applications hosted by the VM) may generate data (e.g., VM data) that is stored in the storage/memory resources of the client, in which the VM data may reflect a state of the VM. In one or more embodiments, the VM may provide services to users, and may host instances of databases, email servers, or other applications that are accessible to the users.

In one or more embodiments, a virtualization resource may include a hypervisor, in which the hypervisor may be configured to orchestrate an operation of a VM by allocating computing resources of a client to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client that when executed by processing resources of the client cause the client to provide the functionality of the hypervisor.

In one or more embodiments, a client may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout this application.

Alternatively, in one or more embodiments, similar to a data center (e.g., 110, 120, etc.), the client may also be implemented as a logical device.

In one or more embodiments, users may interact with (or operate) the clients in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the "virtualization" technology (discussed above).

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 400, FIG. 4) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

Figure 2:
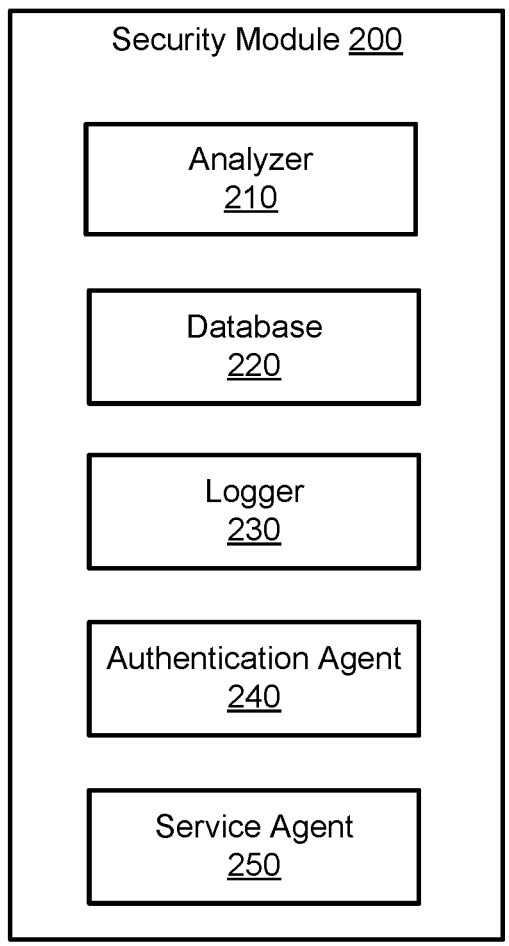
FIG. 2 shows a diagram of a security module in accordance with one or more embodiments of the invention.

Turning now to FIG. 2, FIG. 2 shows a diagram of a security module (200) in accordance with one or more embodiments of the invention. The security module (200) may be an example of one of the security modules (e.g., 116, 126, etc.) discussed above in reference to FIG. 1. The security module (200) may include an analyzer (210), a database (220), a logger (230), an authentication agent (240), and a service agent (250). The security module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the security module (200) may operate in a manner transparent (e.g., a transparent reverse proxy) to any component (e.g., a firewall (e.g., 112, 122, etc., FIG. 1), a SAN infrastructure (e.g., 118, 128, etc., FIG. 1), etc.) of a corresponding data center (e.g., 110, 120, etc., FIG. 1) and any client (described above) (or any user of that client) of the corresponding data center. In one or more embodiments, when any of the components of the security module (200) is down or unavailable to perform its functionalities, a second security module (deployed to the same data center) may continue to provide functionalities of the unavailable component.

In one or more embodiments, the analyzer (210) may include functionality to, e.g.: (i) intercept, identify, and accept/reject (in conjunction with the authentication agent (240)) a request/call/network traffic (e.g., a data replication request) received from an entity (e.g., a SAN infrastructure (e.g., 118, FIG. 1)) using an interception mechanism (i.e., the authentication agent (240)), (ii) provide an additional layer of security/authentication mechanism (on top of a firewall) during any type communication/transaction/operation (e.g., a data replication operation from a first SAN infrastructure (e.g., 118, FIG. 1) to a second SAN infrastructure (e.g., 128, FIG. 1)) (a) for maximum data security, integrity, and availability, and (b) to prevent initiation of any invalid/bogus data replication/retrieval operation, (iii) obtain (or receive) an encrypted secure string-appended request and send that request to the corresponding target (e.g., SAN infrastructure B (e.g., 128, FIG. 1)) over a network (e.g., 105, FIG. 1), (iv) based on (iii), send the encrypted secure string-appended request and its corresponding details (e.g., an IP address of a targeted destination and/or a port address of a target component (e.g., storage in a SAN infrastructure), a client-side configuration associated with the request, information regarding data (e.g., type and/or content of data that is planned to be accessed, a device/domain/unique identifier (IP address) of a user that wants to access that data, etc.), etc.) to the logger (230), (v) intercept and identify (in conjunction with the authentication agent (240)) a request/call (e.g., an encrypted secure string-appended request, a DNS request, an Internet control message protocol (ICMP) request, a network access request to initiate a hacking attack, a data access request, etc.) received from an entity (e.g., another analyzer of another security module (which is a valid/trusted entity), a compromised user, an invalid user, a malicious insider, a credential/data thief, a negligent insider, etc.) based on a security protocol set by the related organization, (vi) based on (v) and the corresponding details of the request (which is decrypted and sent by the authentication agent (240) post decryption), make a determination that the request is valid or not, (vii) based on the determination performed in (vi), reject the invalid request and send the rejected request (including its corresponding details) to the logger (230), (viii) based on the determination performed in (vi), accept the valid request and initiate generation of a secure data replication path (e.g., a secure/encrypted, point-to-point tunnel) (described above in reference to FIG. 1) across (or overlay on) a network (e.g., 105, FIG. 1), (ix) based on the determination performed in (vi), initiate an operation (e.g., a data replication operation) that is defined in the intercepted request (described in (v)) by notifying the valid sender (i.e., the valid entity described in (v)) of that request, (x) in response to receiving a notification from another analyzer, send (or forward) the notification to a component of the corresponding data center (e.g., SAN infrastructure A (e.g., 118, FIG. 1)), (xi) receive outgoing network traffic (e.g., data packets or other communication protocol compliant data structures that are being replicated) from the component (described in (x)) that is planned to be transmitted via the secure data replication path (described in (viii)), (xii) based on (xi), verify (and filter some of the outgoing network traffic if necessary) that the outgoing network traffic satisfies one or more attribution rules specified in the configuration parameters (e.g., verify the validity of the outgoing network traffic), (xiii) based on the verification performed in (xii), initiate transmission of the outgoing network traffic to the target (e.g., SAN infrastructure B (e.g., 128, FIG. 1)) using the secure data replication path, (xiv) send the details of the transmission operation to the logger (230), (xv) notify an administrator of the corresponding data center (e.g., Data Center B (e.g., 120, FIG. 1)) about the initiation of the secure, tamper-free, and efficient transmission operation (e.g., the data replication operation) using the corresponding data center's GUI (or using a visualization module (not shown) of the security module (200)), and (xvi) as part of data management services provided by the corresponding data center (e.g., 110, 120, etc., FIG. 1), provide a secure method for storing and accessing data managed by the corresponding data center (e.g., 110, 120, etc., FIG. 1).

As used herein, a "malicious insider" is a user who intentionally hurt the organization, whether through data theft or by sabotage.

As used herein, a "negligent insider" is a user who unintentionally put the organization's security at risk.

As used herein, a "credential/data thief" is an outside infiltrator who enters the organization through, for example, an employee account.

In one or more embodiments, as mentioned above, the analyzer (210) (i) may operate as a reverse proxy (e.g., a unidirectional proxy, a reverse proxy agent, an interceptor, etc.) (or may be configured to operate in a reverse proxy mode) to intercept and scrutinize all incoming requests/calls/network traffic from the network (e.g., 105, FIG. 1) (that are allowed or not allowed (but bypassed) a corresponding firewall (e.g., 112, 122, etc., FIG. 1) (as the first layer of security)) towards the corresponding data center components (e.g., 118, 128, etc., FIG. 1) to prevent any malicious attacks (e.g., hacking/data hijacking attacks, DDoS attacks, etc.), and (ii) may operate in various different OS architectures based on OS wrapper packaging (e.g., Linux®, Docker®, Microsoft® Windows, etc.), or in any embedded OS, any network OS, any real-time OS, any open source OS, any OS for mobile computing devices, etc. As being a reverse proxy and an additional layer of security, the analyzer (210) may also monitor all the outgoing responses/calls/network traffic and notify the logger (230) to log their details in the database (220). To enable these (and the aforementioned) functionalities of the analyzer (210), the security module (200) may be deployed in-line and between a firewall (e.g., 112, 122, etc., FIG. 1) and other components of a corresponding data center (e.g., 110, 120, etc., FIG. 1). In this manner, for example, (i) all network traffic may pass through the security module (200) before arriving at a destination within a corresponding data center (e.g., the analyzer (210) may manage all incoming requests from a client, and direct the valid requests to one or more services provided by the corresponding data center), (ii) the analyzer (210) may forward, re-route, load-balance, or otherwise provide (in conjunction with the authentication agent (240)) the received network communication (e.g., data packets) to a corresponding SAN infrastructure (e.g., 118, 128, etc., FIG. 1), (iii) the analyzer (210) may block (in conjunction with the authentication agent (240)) an invalid request/call/network traffic (see Step 338 of FIG. 3.3), and (iv) the analyzer (210) may filter (e.g., drop) some of the outgoing network traffic (i.e., data packets or other communication protocol compliant data structures) that is planned to be transmitted via a secure data replication path (see Step 330 of FIG. 3.3).

As used herein, a "reverse proxy" protects components (e.g., web servers) of a computing device (e.g., a data center) from various different attacks and typically be implemented to increase security, performance, and reliability of that computing device. In most cases, as being an application-level gateway, a reverse proxy may sit in front of a data center and intercept one or more requests sent by a client over a network. If the requests are valid, the reverse proxy may forward them to a corresponding component of the data center for processing, and may then intercept the responses for those requests before initiating the transmission of those responses to the client. In this manner, no client ever communicates directly with the components of the data center.

A reverse proxy may provide one or more functionalities, for example (but not limited to): load balancing (to distribute incoming network traffic evenly among different servers of a data center to prevent any single server from becoming overloaded), protection from attacks (e.g., with a reverse proxy in place, a service never needs to reveal the IP address of its server, which makes harder to perform a DDoS attack), global server load balancing, caching (e.g., for faster data center performance, a reverse proxy may cache (temporarily save) response data), encryption (e.g., a reverse proxy may be configured to decrypt all incoming requests and encrypt all outgoing responses, in order to free up some of the resources of a data center), etc.

In one or more embodiments, the analyzer (210) may include any logic, business rule, function, and/or operation for optimizing, accelerating, or otherwise improving the performance, operation, and/or quality of service of outgoing network traffic or the delivery of data packets at the network (e.g., 105, FIG. 1) via the corresponding network device (e.g., 114, 124, etc., FIG. 1). In this manner, the analyzer (210) may (a) regulate (or manage) data transfer rates (e.g., data transfer via a high priority network slide that implements a high communication bandwidth network capacity, data transfer via a low priority network slice that implements a low communication bandwidth network capacity, etc.) and data receipt rates in conjunction with the corresponding network device (e.g., 114, 124, etc., FIG. 1), (b) coordinate with the corresponding network device (e.g., 114, 124, etc., FIG. 1) to manipulate, adjust, simulate, change, improve, or otherwise adapt the behavior of a predetermined data transfer protocol to improve performance of delivery, data rates and/or communication bandwidth utilization of the network (e.g., 105, FIG. 1), (c) implement (in conjunction with the corresponding network device (e.g., 114, 124, etc., FIG. 1)) a data transfer/flow control method, for example (but not limited to): a pre-acknowledgement method, a window virtualization method, a re-congestion method, a local re-transmission method, a wavefront detection and disambiguation method, a transaction boundary detection method, a re-packetization method, etc., (d) measure and monitor the performance of, for example, any VPN connections and/or sessions (e.g., an SSL VPN session) established by the corresponding network device (e.g., 114, 124, etc., FIG. 1), and (e) measure and monitor the performance of any acceleration technique performed by the corresponding network device (e.g., 114, 124, etc., FIG. 1), such as SSL offloading, load balancing and/or content switching, connection pooling and multiplexing, caching, and compression.

Further, to manage network communications performed by the corresponding network device (e.g., 114, 124, etc., FIG. 1), the analyzer (210) may configure that network device. For example, the analyzer (210) may disable/enable some of the ports of the corresponding network device (e.g., 114, 124, etc., FIG. 1) depending on a user level of a user (e.g., a high priority user, a low priority user, etc.) that requested a specific computer-implemented service. Thus, while the components of the corresponding data center (e.g., 110, 120, etc., FIG. 1) may be capable of performing any number of computer-implemented services, they may be limited in providing some of their services. In this manner, the analyzer (210) may prevent a low priority user from communicating with the corresponding component of, for example, Data Center A (e.g., 110, FIG. 1) using certain ports (which are assigned for providing the computer-implemented services to high priority users).

For example, consider a scenario in which a client communicates with a server of Data Center A (e.g., 110, FIG. 1) for (i) graphics displaying services via a first port (of Network Device A (e.g., 114, FIG. 1)) and (ii) instant messaging services via a second port (of Network Device A (e.g., 114, FIG. 1)). Based on the intercepted communication(s), the analyzer (210) may (a) obtain information (e.g., credentials, identifiers, etc.) regarding the user (e.g., a low priority user) of the client (who triggered the communication(s)), (b) based on (a), identify the services to be provided to that user (using the database (220)), and (c) configure Network Device A (e.g., 114, FIG. 1) to limit the network connectivity between the server and the client in a manner that limits the ability of the server to only provide the identified services to that user. If the user is not to be provided with instant messaging services, the analyzer (210) may configure Network Device A (e.g., 114, FIG. 1) so that the communication (via the second port) between the client and the server may be prevented. In order to prevent the communication, Network Device A (e.g., 114, FIG. 1) may drop the data packets (or other communication protocol compliant data structures) transmitted via the second port, thereby preventing the server from providing instant messaging services while still being able to provide graphics displaying services (e.g., because packets corresponding to these services are being transmitted via the first port, which is enabled).

One of ordinary skill will appreciate that the analyzer (210) may perform other functionalities without departing from the scope of the invention. When providing its functionalities, the analyzer (210) may perform all, or a portion, of the methods illustrated in FIGS. 3.1-3.3. The analyzer (210) may be implemented using hardware, software, or any combination thereof.

In one or more embodiments, the database (220) may be a fully managed, local, and lightweight database (or any logical container such as SQLite database) that acts as a shared storage or memory resource (discussed above) that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services (e.g., storing data and providing copies of previously stored data). The devices that provide data storage services may include hardware devices and/or logical devices. For example, the database (220) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (220) may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (220) may store (temporarily or permanently) unstructured and/or structured data that may include (or specify), for example (but not limited to): a mode of data replication operation (e.g., a synchronous data replication operation, an asynchronous data replication operation, etc.), one or more configuration parameters (described below) provided/configured by an administrator of a data center, one or more lists that specify which computer-implemented services should be provided to which user (depending on a user access level of a user), one or more policies/rules for the operation (or configuration) of any portion of the analyzer (210) (to manage security, network traffic, network access, or any other function/operation performed by the analyzer (210)), details of each data center of an organization (e.g., how many storage boxes deployed to each SAN infrastructure, information regarding the criticality of data stored in a storage box, an IP address of each component deployed to a data center, active/passive port numbers of each component deployed to a data center, a product identifier of each component deployed to a data center, etc.) to provide a complete data protection, integrity, and availability across those data centers, a profile of a valid user, a profile of an invalid user, one or more outputs of the processes performed by the analyzer (210), one or more outputs of the processes performed by the authentication agent (240), information regarding when the latest secure string was generated, information regarding when the latest generated secure string was expired, a fraud report for an invalid user, a set of SLAs (e.g., an agreement that indicates a period of time required to retain a profile of a user), recently obtained user information (e.g., records, credentials, etc.) of a user, a port's user guide, a port's release note, a user posted approximated port activation time, a model name of a hardware component, a serial number of a computing device, a hardware identification (ID) number of a hardware component, an identifier of a computing device's manufacturer, a setting of an application, a version of an application, a product identifier of an application, etc.

In one or more embodiments, the configuration parameters may specify (or include), for example (but not limited to): a request ruleset; a response ruleset; a secure string generation parameter; one or more rules/policies for (a) what data to cache, (b) when to cache the data, (c) for whom to cache the data, and (d) when to expire an object in cache or refresh the cache; one or more rules/policies that are provided based on (i) a profile of a user, (ii) an identification of a client, (iii) a type of a network connection, (iv) a type of a SAN infrastructure, (v) contents/payloads of network traffic; etc.

In one or more embodiments, during the deployment of the security module (200), an administrator of the corresponding data center (e.g., 110, 120, etc., FIG. 1) may directly provide the configuration parameters (which may be configured directly), or the configuration parameters may be imported by the administrator in the form of, for example, an extensible markup language (XML) file or JavaScript object notation (JSON) file.

In one or more embodiments, a request ruleset (e.g., one or more rules/configurations that allow the analyzer (210) to act as an inbound/incoming network traffic filter, one or more reverse proxy parameters, etc.) may specify (or include), for example (but not limited to): a request decryption rule, a secure string encryption rule, a request authentication rule (which may be utilized by the authentication agent (240) to validate a request), a rule regarding a secure string expiry timeframe, a rule regarding how the analyzer (210) should operate, a type of an allowable network communication/protocol between an entity and the components of a data center, a particular header that needs to be included in an intercepted request, a smart contract that defines under what conditions a request should be accepted (e.g., granted), a smart contract that defines under what conditions a data packet should be transferred to a SAN infrastructure, one or more rules/policies for detecting and blocking illegitimate requests and application-based attacks, one or more rules/policies to protect components of a data center against various classes and types of Internet-based vulnerabilities (e.g., buffer overflow, common gateway interface (CGI)-Bin parameter manipulation, form/hidden filed manipulation, forceful browsing, cross-site scripting (XSS), command injection, error triggering sensitive information leak, back doors and debug options, platform or OS vulnerabilities, etc.), etc.

In one or more embodiments, the authentication related rules (e.g., a secure string encryption rule) included in the request ruleset may be the same across all data centers of an organization to perform a uniform and successful authentication process.

In one or more embodiments, a response ruleset (e.g., one or more rules/configurations that allow the analyzer (210) to act as an outbound network traffic filter) may include (or specify), for example (but not limited to): an attribution rule (e.g., a type/format of an asset (e.g., a ".pdf" file, a ".doc" file, a ".jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc.

In one or more embodiments, the authentication related rules included in the response ruleset may be the same across all data centers of an organization to perform a uniform and successful authentication process.

In one or more embodiments, the database (220) may provide an indexing service. More specifically, an agent of the database (220) may receive various data authentication related inputs directly from, for example, the analyzer (210). Upon receiving, the agent may analyze those inputs to generate an index(es) (e.g., a data authentication index(es)) for optimizing the performance of the database (220) by reducing a required amount of database access(es) when implementing a request (e.g., a data retrieval request). In this manner, requested data may be quickly located and accessed from the database (220) using an index of the requested data.

In one or more embodiments, an index may refer to a database structure that is defined by one or more field expressions. A field expression may be a single field name such as "user_number". For example, an index (e.g., E41295) may be associated with "user name" (e.g., Adam Smith) and "user_number" (e.g., 012345), in which the requested data is "Adam Smith 012345".

Further, in one or more embodiments, an index may include, for example (but not limited to): information about a valid user associated with a data replication operation (e.g., a data backup operation, a data recovery operation, etc.), a keyword/tag extracted from a data replication operation that relates to a type of the replication (e.g., a synchronous data replication operation), etc. The index(es) may also include other information that may be used to efficiently identify historical data replication operations. In one or more embodiments, the aforementioned data may be stored as "data replication operation metadata" in the database (220), in which the corresponding data may be replicated to (temporarily or permanently) a storage box of a SAN infrastructure (e.g., 118, 128, etc., FIG. 1).

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available. The unstructured and/or structured data may also be updated when, for example (but not limited to): a different type of attack is captured for data access, a new response ruleset is generated, a new request ruleset is generated, etc.

In one or more embodiments, the unstructured and/or structured data may be maintained by, for example, the analyzer (210). The analyzer (210) may add, remove, and/or modify those data in the database (220) to cause the information included in the database (220) to reflect the latest version of, for example, configuration parameters. The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the invention.

While the database (220) has been illustrated and described as including a limited number and type of data, the database (220) may store additional, less, and/or different data without departing from the scope of the invention.

One of ordinary skill will appreciate that the database (220) may perform other functionalities without departing from the scope of the invention. When providing its functionalities, the database (220) may perform all, or a portion, of the methods illustrated in FIGS. 3.1-3.3. The database (220) may be implemented using hardware, software, or any combination thereof.

In one or more embodiments, the logger (230) may be a shared storage or memory resource (discussed above) that is functional to store unstructured and/or structured data. Further, the logger (230) may also occupy a portion of a physical storage/memory device or, alternatively, may span across multiple physical storage/memory devices.

In one or more embodiments, the logger (230) may be implemented using physical devices that provide data storage services. The devices that provide data storage services may include hardware devices and/or logical devices. For example, the logger (230) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (230) may include a memory device (e.g., a dual in-line memory device), in which data is stored and from which copies of previously stored data are provided. As yet another example, the logger (230) may include a persistent storage device (e.g., an SSD), in which data is stored and from which copies of previously stored data is provided. As yet another example, the logger (230) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (230) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (230) may store/log/record (temporarily or permanently, in conjunction with the database (220), and based on the log level configuration set by an administrator of the data center (e.g., 110, 120, etc., FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data replication operation, one or more details (e.g., content of the intercepted data packets, information regarding the sender (e.g., a malicious user, a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data replication operation history documentation of a valid user, recently obtained user activity records, a cumulative history of user activity records obtained over a prolonged period of time, a cumulative history of network traffic logs obtained over a prolonged period of time, previously received malicious data access requests from an invalid user, previously received malicious data replication requests from an invalid user, backup history documentation of a workload, a documentation that indicates a set of jobs (e.g., a data replication job, a data restore job, etc.) that has been initiated, a documentation that indicates a status of a job (e.g., how many jobs are still active, how many jobs are completed, etc.), a cumulative history of initiated data replication operations (e.g., sessions) over a prolonged period of time, a cumulative history of initiated data restore operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), etc. Based on the aforementioned data, for example, the analyzer (210) may perform user analytics to infer the profile of users communicating with the corresponding data center (e.g., 110, 120, etc. FIG. 1).

In one or more embodiments, data logged by the logger (230) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access the data without departing from the scope of the invention. When the logger (230) stores data in itself, the logger (230) may provide a corresponding registration record to the database (220). The database (220) may utilize the aforementioned registration record to notify other entities of the existence of the data and/or to facilitate access to the data in the future.

In one or more embodiments, the unstructured and/or structured data may be maintained by, for example, the analyzer (210). The analyzer (210) may add, remove, and/or modify those data in the logger (230) to cause the information included in the logger (230) to reflect the latest version of, for example, configuration parameters. The unstructured and/or structured data available in the logger (230) may be implemented using, for example, lists, tables, unstructured data, structured data, etc. While described as being stored locally, the unstructured and/or structured data may be stored remotely, and may be distributed across any number of devices without departing from the scope of the invention.

While the logger (230) has been illustrated and described as including a limited number and type of data, the logger (230) may store additional, less, and/or different data without departing from the scope of the invention.

One of ordinary skill will appreciate that the logger (230) may perform other functionalities without departing from the scope of the invention. When providing its functionalities, the logger (230) may perform all, or a portion, of the methods illustrated in FIGS. 3.2 and 3.3. The logger (230) may be implemented using hardware, software, or any combination thereof.

In one or more embodiments, the authentication agent (240) may include functionality to, e.g.: (i) obtain (or receive) system time of a component (e.g., a SAN infrastructure (e.g., 118, FIG. 1)) of a data center (e.g., Data Center A (e.g., 110, FIG. 1)), (ii) based on (i), convert the system time to Coordinated Universal Time (UTC)-based system time (to maintain system time uniformity around the world), (iii) generate, based on the UTC-based system time and one or more configuration parameters (e.g., parameters to generate a secure string, reverse proxy parameters, etc.) set by an administrator of the component, a fresh secure string (e.g., a secure token, a secure password, etc.) (for all, for example, SAN infrastructure to SAN infrastructure data replication operations), (iv) based on (iii), encrypt (e.g., a way of translating data from plaintext (unencrypted) to ciphertext (encrypted), in which encrypted data may be accessed with an encryption key) the secure sting using an encryption model (e.g., an asymmetric encryption method, a symmetric encryption model, a 128-bit encryption model, etc.), (v) based on (iv), append the encrypted secure string to a request (e.g., a data replication request) intercepted by the analyzer (210), (vi) based on (v), send the encrypted secure string-appended request and its corresponding details to the analyzer (210), (vii) decrypt (e.g., a way of translating data from ciphertext to plaintext, in which decrypted data may be accessed with a decryption key) a request/call/network traffic (e.g., an encrypted secure string-appended request) intercepted by the analyzer (210), and (viii) based on (vii) extract (by implementing any necessary process such as, for example, network address translation) and send the corresponding details of the decrypted (e.g., resolved) request to the analyzer (210).

One of ordinary skill will appreciate that the authentication agent (240) may perform other functionalities without departing from the scope of the invention. When providing its functionalities, the authentication agent (240) may perform all, or a portion, of the methods illustrated in FIGS. 3.1-3.3. The authentication agent (240) may be implemented using hardware, software, or any combination thereof.

In one or more embodiments, the service agent (250) may include functionality to manage one or more services provided by a component of the security module (200). For example, the service agent (250) may shut down one or more services/functionalities (e.g., the logging service) provided by the logger (230) if the analyzer (210) could not perform its main services/functionalities because of a recent surge in incoming network traffic (e.g., when there is an unusually high amount of activity in the incoming network traffic).

One of ordinary skill will appreciate that the service agent (250) may perform other functionalities without departing from the scope of the invention. The service agent (250) may be implemented using hardware, software, or any combination thereof.

In one or more embodiments, the security module (200) may also include a visualization module. The visualization module may include functionality to, e.g.: (i) receive one or more details (described above) of a recently initiated data replication operation, and display the aforementioned content on its GUI (for example, to an administrator of the corresponding data center), (ii) receive one or more details (described above) of an incoming request/call/network traffic, and display the aforementioned content on its GUI (for example, in a separate window(s) on its GUI), and (iii) receive one or more details (described above) of an outgoing request/call/network traffic, and display the aforementioned content on its GUI (for example, in a separate window(s) on its GUI). In one or more embodiments, the visualization module may concurrently display one or more separate windows on its GUI. Further, the visualization module may include functionality to generate visualizations of methods illustrated in FIGS. 3.1-3.3.

In one or more embodiments, for example, while displaying an incoming request/call/network traffic and/or an outgoing request/call/network traffic, the visualization module may represent: (i) a normal (e.g., a valid) incoming request/call/network traffic with green color tones and (ii) an abnormal (e.g., an invalid) incoming request/call/network traffic with red color tones.

One of ordinary skill will appreciate that the visualization module may perform other functionalities without departing from the scope of the invention. The visualization module may be implemented using hardware, software, or any combination thereof.

In one or more embodiments, the analyzer (210), database (220), logger (230), authentication engine (240), service agent (250), and visualization module may be utilized in isolation and/or in combination to provide the above-discussed functionalities. These functionalities may be invoked using any communication model including, for example, message passing, state sharing, memory sharing, etc. By doing so, the security module (200) may address issues related to data security, integrity, and availability proactively.

FIGS. 3.1-3.3 show a method for secure and synchronous/asynchronous SAN infrastructure to SAN infrastructure data replication in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed security module (e.g., 200, FIG. 2). Other components of the system (100) illustrated in FIG. 1 may also execute all or part of the method shown in FIG. 3.1 without departing from the scope of the invention.

In Step 300, the security module (e.g., a first security module) deployed to a data center (e.g., Data Center A (e.g., 110, FIG. 1)) intercepts a data replication request from a first SAN infrastructure (e.g., SAN infrastructure A (e.g., 118, FIG. 1)) that wants to initiate a data replication operation from the first SAN infrastructure to a second SAN infrastructure (e.g., SAN infrastructure A (e.g., 128, FIG. 1)), in which the data replication request was intended to be sent to the second SAN infrastructure (but stopped at the first security module).

In one or more embodiments, for example, the request may be triggered indirectly by a user of a client, in which, at first, the user may upload one or more data packets to the first SAN infrastructure (e.g., deployed to Data Center X of an organization) and then the first SAN infrastructure may need to replicate those data packets to the second SAN infrastructure (e.g., deployed to Data Center Y of the organization) to provide, at least, (i) optimal level of data integrity and availability among all geographically distributed data centers of the organization (with almost zero downtime on operations and/or interruption in service) and (ii) a better user experience to one or more users of those data centers.

In Step 302, in response to the data replication request (intercepted in Step 300), the first security module obtains (current) system time of the first SAN infrastructure.

In Step 304, the first security module converts the system time (obtained in Step 302) to UTC-based system time (to maintain system time uniformity around the world).

In Step 306, the first security module generates a fresh secure string based on the UTC-based system time and configuration parameters (described above in reference to FIG. 2) set by an administrator of the first SAN infrastructure. In one or more embodiments, the administrator may directly provide a secure string (e.g., a password, an identifier, a sentence, etc.) to the first security module. If this is the case (e.g., if the secure string is administrator-defined/provided), the administrator should not provide a secure string that may be guessed easily. In one or more embodiments, once the secure string is generated (or obtained directly from the administrator), the first security module may store (temporarily or permanently) a copy of the secure string in its database (e.g., 220, FIG. 2).

In one or more embodiments, configuration parameters may specify a rule/parameter regarding a secure string expiry timeframe, which is set by the administrator, and is the same across all data centers of the organization to perform a uniform and successful authentication process. By setting this parameter, for example, the administrator may indicate (i) a performance of a synchronous data replication operation or (ii) a performance of an asynchronous data replication operation. In one or more embodiments, for example, the administrator may set the secure string expiry timeframe to zero (indicating a fresh secure string should be generated for each data replication operation to make the operation more secure) to employ a synchronous data replication (indicating the data replication request (intercepted in Step 300) should be treated as a live request and immediately (e.g., less than five seconds) sent to the second SAN infrastructure for examination (by a second security module deployed to a data center (e.g., Data Center B (e.g., 120, FIG. 1))) and initiation of a data replication operation). If the secure string expiry timeframe was not set by the administrator, by default, the timeframe may be set to zero (indicating a synchronous data replication operation should be performed).

As yet another example, the administrator may not set the secure string expiry timeframe to zero (e.g., may be set to ten minutes) to employ an asynchronous data replication (indicating (a) the data replication request (intercepted in Step 300) should not be treated as a live request and any request/call/network traffic intercepted within ten minutes from its generation (including any live request/call/network traffic as well) should be examined by the second security module that protects the second SAN infrastructure, and (b) any data request/call/network traffic that is not intercepted within ten minutes from its generation should be ignored by the second security module). If this is the case, the timeframe may be considered as a parameter to decide whether or not an incoming request/call/network traffic should be examined and a data replication operation should be initiated afterwards.

Turning now to FIG. 3.2, the method shown in FIG. 3.2 may be executed by, for example, the above-discussed first security module. Other components of the system (100) illustrated in FIG. 1 may also execute all or part of the method shown in FIG. 3.2 without departing from the scope of the invention.

In Step 308, the first security module encrypts the secure string (generated or obtained in Step 306 of FIG. 3.1) using an encryption model (e.g., an asymmetric encryption method, a symmetric encryption model, a 128-bit encryption model, etc.). In one or more embodiments, once the secure string is encrypted, the first security module may store (temporarily or permanently) a copy of the encrypted secure string in its database. Details of the encryption process are described above in reference to FIG. 2.

In Step 310, the first security module appends (e.g., incorporates) the encrypted secure string to the data replication request (intercepted in Step 300), in which the encrypted secure string is appended to a header part of the request (to (i) supply authentication credentials associated with the request, (ii) make the request verifiable, (iii) enable other entities (e.g., the second security module) to trust the accuracy of information included in the request (for example, the secure string may act as proof of the request), and (iv) announce its presence). In one or more embodiments, the header may also include information regarding, for example (but not limited to): a user (e.g., a high priority user, a low priority user, etc.), a network connection (e.g., information regarding network traffic flow), content of a data packet, size of a data packet, an IP address of a target destination, a port address of a target destination, a protocol that is being used by a target destination, an encryption model that was used to encrypt a secure string, etc.

As used herein, a "request header" refers to an HTTP header that may be incorporated into an HTTP request to provide information regarding the request's context so that a corresponding server may provide its service accordingly. For example, "accept*" header may indicate a preferred format of a response (from the server). One or more other headers may also be incorporated into the HTTP request to, for example, supply authentication credentials, control caching, and/or get information regarding the server.

In Step 312, the first security module sends the encrypted secure string-appended request to the second SAN infrastructure over a network (e.g., 105, FIG. 1). Details of the network are described above in reference to FIG. 1.

In Step 314, the first security module logs the encrypted secure string-appended request and its corresponding details in its database. In one or more embodiments, an analyzer (e.g., 210, FIG. 2) of the first security module may first send the encrypted secure string-appended request and its corresponding details to a logger (e.g., 230, FIG. 2) of the first security module (or the logger may obtained the aforementioned information). The logger may then log the aforementioned information in the database (of the first security module).

In one or more embodiments, the corresponding details may include, for example (but not limited to): an IP address of a target destination and/or a port address of a target component (e.g., storage in the second SAN infrastructure), a client-side configuration associated with the request, information regarding data (e.g., type and/or content of data that is planned to be accessed, a device/domain/unique identifier (IP address) of a user that wants to access that data, etc.), API information of the request, a text length of the request, a request body of the request, etc.

In one or more embodiments, the method may end following Step 314.

Turning now to FIG. 3.3, the method shown in FIG. 3.3 may be executed by, for example, the above-discussed first security module, second security module, and first SAN infrastructure. Other components of the system (100) illustrated in FIG. 1 may also execute all or part of the method shown in FIG. 3.3 without departing from the scope of the invention.

In Step 316, the second security module intercepts the encrypted secure string-appended request (sent in Step 312 of FIG. 3.2) before it arrives its targeted destination. In one or more embodiments, after decrypting the intercepted request (by its authentication agent (e.g., 240, FIG. 2)), the second security module may analyze (e.g., inspect, perform feature engineering based on a historical record under the provided/obtained IP address information, etc.) the encrypted secure string-appended request (and its corresponding details) in accordance with rules/policies set by the administrator of Data Center B to extract useful information, for example (but not limited to): API information associated with the intercepted request, IP address information of the targeted destination (e.g., the second SAN infrastructure), a text length of the intercepted request, a body of the intercepted request, a header of the intercepted request, IP address information (e.g., identity) of an entity (e.g., a data consumer, a computing device, etc.) that sent the request, etc.

In one or more embodiments, during the analysis, if the historical record of the provided/obtained IP address information is empty, the intercepted request may be an abnormal request (e.g., no "encrypted secure string-appended request" detected) (or may be a normal request that is sent by another authorized user).

In one or more embodiments, the second security module may then store (temporarily or permanently) a copy of the extracted information in its database.

In one or more embodiments, while the second security module analyzes the intercepted request, the second security module may concurrently continue to provide its services to Data Center B to provide maximum level data protection, integrity, and availability for the components (see FIG. 1) of Data Center B. For example, while analyzing an intercepted request/call/incoming network traffic, the second security module may also intercept another request/call/incoming network traffic in parallel.

In Step 318, based on the configuration parameters (e.g., the request ruleset, described above in reference to FIG. 2), extracted information (in Step 316), and secure string expiry timeframe (set in Step 306; because (a) a secure string may be valid until the associated expiry timeframe has passed and (b) any request having a secure string that has passed the associated expiry timeframe may be rejected), the second security module makes a determination as to whether the intercepted request (in Step 316) is valid. Accordingly, in one or more embodiments, if the result of the determination is YES, the method proceeds to Step 320. If the result of the determination is NO, the method alternatively proceeds to Step 338.

In one or more embodiments, based on the determination, the second security module may infer (or identify) whether, for example (but not limited to): a user that initiated the request has the required credentials (e.g., a required level of user priority) and/or is authorized to access data within Data Center B, the intercepted request is a valid request (e.g., the request sent by an authorized/trusted user, the request is an authentic request, etc.) or an invalid request (e.g., the request is related to a network attack initiated by a hacker), an "encrypted secure string" was appended to the header of the intercepted request, a secure string expiry timeframe is satisfied (with, for example, milliseconds sensitivity), etc.

In Step 338, as a result of the determination in Step 318 being NO, the second security module tags the request as an invalid request (e.g., an abnormal request) and rejects (by taking a preventive/proactive policy action) the invalid request (so that (i) unauthorized entities cannot access to the business-critical data within Data Center B and (ii) a data replication operation may not be initiated unless and until the second security module validates the request). In one or more embodiments, the second security module may then send a fake response (or a fake notification) to the malicious sender (e.g., the hacker) that initiated the invalid request.

In Step 340, the second security module logs the rejected request and its corresponding details in its database. In one or more embodiments, an analyzer of the second security module may first send the rejected request and its corresponding details to a logger of the second security module (or the logger may obtained the aforementioned information). The logger may then log the aforementioned information in the database (of the second security module).

In one or more embodiments, the method may end following Step 340.

In Step 320, as a result of the determination in Step 318 being YES, the second security module tags the request as a valid request (e.g., a normal request), logs the accepted/verified request and its corresponding details in its database, and initiates generation of a secure data replication path (e.g., a secure tunnel) across the network (in conjunction with, for example, Network Device A (e.g., 114, FIG. 1) and Network Device B (e.g., 124, FIG. 1)). To this end, Network Device A and Network Device B may take action (or otherwise cooperate) in changing their configuration (e.g., modifying their policies, protocols, etc.) to generate the secure tunnel based on information obtained from the second security module. Details of Network Device A, Network Device B, and secure tunnel are described above in reference to FIG. 1.

In Step 322, the second security module initiates the data replication operation (requested in Step 300 of FIG. 3.1) by notifying the first security module. In one or more embodiments, when the first security module receives the notification (e.g., the indication to initiate the data replication operation) (which satisfies one or more attribution rules specified in the configuration parameters), both security modules may now be aware of each other and the data replication operation may be appropriately accelerated.

In Step 324, upon receiving the notification (in Step 322), the first security module sends/forwards the notification to the first SAN infrastructure, in which the first SAN infrastructure may not be aware of the first security module (because of its transparency) and may assume that the notification is forwarded by the firewall (e.g., 112, FIG. 1) of Data Center A.

In Step 326, upon receiving the notification (in Step 324), the first SAN infrastructure starts replicating data from the first SAN infrastructure to the second SAN infrastructure.

In Step 328, the first security module receives the data (that is being replicated in Step 326) from the first SAN infrastructure.

In Step 330, the first security module verifies (by scrutinizing the data) whether or not the data satisfies one or more attribution rules specified in the configuration parameters. In one or more embodiments, based on the verification, the first security module may filter (e.g., drop) some of data packets of the data that is planned to be transmitted to the second SAN infrastructure via the secure tunnel (initiated in Step 320). Details of the attribution rules are described above in reference to FIG. 2.

In Step 332, based on the verification performed in Step 330, the first security module initiates transmission of the replicated data to the second SAN infrastructure using the secure tunnel. In one or more embodiments, if a retransmission of the data is required (when, for example, a receipt acknowledgement has not been received by the first security module for the data after a predetermined period of time), the first security module may reinitiate the transmission of the data. To this end, the first security module may monitor acknowledgement(s) generated by the second security module so that the first security module may determine whether the data has been successfully delivered (so that, for example, Data Center A's resources may become free to perform a subsequent process) or needs to be retransmitted.

In Step 334, the first security module logs the details (e.g., number data packets that has been transmitted, total size of the data that has been transmitted, one or more details regarding the secure tunnel, etc.) of the transmission in its database. In one or more embodiments, the analyzer of the first security module may first send the transmission details to the logger of the first security module (or the logger may obtained the aforementioned information). The logger may then log the aforementioned information in the database (of the first security module).

In Step 336, in response to the initiation of the transmission (in Step 332), the first security module notifies the administrator of Data Center A about the transmission using a GUI of first security module (which is included in a visualization module of the first security module).

In one or more embodiments, the method may end following Step 336.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data replication operation, the method comprising:
   obtaining, by a first security module (FSM), coordinated universal time (UTC)-based system time of a first storage area network (SAN) infrastructure;
   generating, by the FSM, a secure string based on the UTC-based system time and a configuration parameter set by a user of the first SAN infrastructure;
   encrypting, by the FSM, the secure string to generate an encrypted secure string;

appending, by the FSM, the encrypted secure string to a data replication request to generate an encrypted secure string-appended request, wherein the data replication request is received from the first SAN infrastructure;

sending, by the FSM, the encrypted secure string-appended request to a second SAN infrastructure;

making, after intercepting the encrypted secure string-appended request and by a second security module (SSM), a determination that the encrypted secure string-appended request is valid; and initiating, based on the determination and by the SSM, the data replication operation from the first SAN infrastructure to the second SAN infrastructure by sending a notification to the FSM.

2. The method of claim 1, further comprising:

before initiating the data replication operation and by the SSM, generating a secure data replication path across a network, wherein the secure data replication path is generated by employing a tunneling protocol;

sending, by the SSM, the notification to the first SAN infrastructure;

replicating, based on the notification and by the first SAN infrastructure, data from the first SAN infrastructure to the second SAN infrastructure;

receiving, by the FSM, the data from the first SAN infrastructure;

verifying, by the FSM, that the data satisfies an attribution rule specified in the configuration parameter; and initiating, by the FSM, transmission of the data to the second SAN infrastructure using the secure data replication path.

3. The method of claim 1, wherein the configuration parameter specifies at least one selected from a group consisting of a mode of the data replication operation, a request ruleset, a response ruleset, and a secure string generation parameter.

4. The method of claim 3, wherein the request ruleset specifies at least a request decryption rule and a request authentication rule to validate the encrypted secure string-appended request.

5. The method of claim 3, wherein the response ruleset specifies at least an attribution rule, wherein the attribution rule specifies at least one selected from a group consisting of a type of an asset, a size of an asset, a content of an asset, and an identifier of an asset.

6. The method of claim 3, wherein the mode of the data replication operation is a synchronous mode or an asynchronous mode.

7. The method of claim 6, wherein the user sets the secure string generation parameter to employ the asynchronous mode, wherein the secure string generation parameter specifies at least a period of time greater than five minutes within which the encrypted secure string-appended request needs to be sent to the second SAN infrastructure.

8. The method of claim 6, wherein the user sets the secure string generation parameter to employ the synchronous mode, wherein the secure string generation parameter specifies at least a period of time less than five seconds within which the encrypted secure string-appended request needs to be sent to the second SAN infrastructure.

9. The method of claim 1, wherein the secure string is encrypted by employing a 128-bit encryption model.

10. A method for managing a data replication operation, the method comprising:

obtaining coordinated universal time (UTC)-based system time of a first storage area network (SAN) infrastructure;

generating a secure string based on the UTC-based system time and a configuration parameter set by a user of the first SAN infrastructure;

encrypting the secure string to generate an encrypted secure string;

appending the encrypted secure string to a data replication request to generate an encrypted secure string-appended request, wherein the data replication request is received from the first SAN infrastructure;

sending the encrypted secure string-appended request to a second SAN infrastructure;

in response to the encrypted secure string-appended request being sent, receiving a notification from a second security module (SSM) about initiation of the data replication operation from the first SAN infrastructure to the second SAN infrastructure; and initiating, based on the notification, transmission of data to the second SAN infrastructure using a secure data replication path.

11. The method of claim 10, further comprising:

before sending the notification and by the SSM, generating the secure data replication path across a network, wherein the secure data replication path is generated by employing a tunneling protocol; and before initiating the transmission:

sending the notification to the first SAN infrastructure;

replicating, based on the notification and by the first SAN infrastructure, data from the first SAN infrastructure to the second SAN infrastructure;

receiving the data from the first SAN infrastructure; and verifying that the data satisfies an attribution rule specified in the configuration parameter.

12. The method of claim 10, wherein the configuration parameter specifies at least one selected from a group consisting of a mode of the data replication operation, a request ruleset, a response ruleset, and a secure string generation parameter.

13. The method of claim 12, wherein the request ruleset specifies at least a request decryption rule and a request authentication rule to validate the encrypted secure string-appended request.

14. The method of claim 12, wherein the response ruleset specifies at least an attribution rule, wherein the attribution rule specifies at least one selected from a group consisting of a type of an asset, a size of an asset, a content of an asset, and an identifier of an asset.

15. The method of claim 12, wherein the mode of the data replication operation is a synchronous mode or an asynchronous mode, wherein the user sets the secure string generation parameter to employ the asynchronous mode, wherein the secure string generation parameter specifies at least a period of time greater than five minutes within which the encrypted secure string-appended request needs to be sent to the second SAN infrastructure, and wherein the user sets the secure string generation parameter to employ the synchronous mode, wherein the secure string generation parameter specifies at least a period of time less than five seconds within which the encrypted secure string-appended request needs to be sent to the second SAN infrastructure.

16. A method for managing a data replication operation, the method comprising:
intercepting an encrypted secure string-appended request, wherein the encrypted secure string-appended request is sent by targeting a first storage area network (SAN) infrastructure;
making, after intercepting the encrypted secure string-appended request, a determination that the encrypted secure string-appended request is valid;
initiating, based on the determination, the data replication operation by sending a notification to a security module (SM), wherein the encrypted secure string-appended request is sent by the SM, wherein the SM generates the encrypted secure string-appended request, wherein generation of the encrypted secure string-appended request comprises:
obtaining coordinated universal time (UTC)-based system time of a second SAN infrastructure;
generating a secure string based on the UTC-based system time and a configuration parameter set by a user of the second SAN infrastructure;
encrypting the secure string to generate an encrypted secure string; and
appending the encrypted secure string to a data replication request to generate the encrypted secure string-appended request, wherein the data replication request is received from the second SAN infrastructure;
in response to the notification being sent, receiving data that is replicated from the second SAN infrastructure to the first SAN infrastructure; and
notifying a user of the first SAN infrastructure about a completion of the data replication operation using a graphical user interface (GUI) of the first SAN infrastructure.

17. The method of claim 16, further comprising:
before initiating the data replication operation, generating a secure data replication path across a network, wherein the secure data replication path is generated by employing a tunneling protocol, wherein the data is received via the secure data replication path.

18. The method of claim 16, wherein the configuration parameter specifies at least one selected from a group consisting of a mode of the data replication operation, a request ruleset, a response ruleset, and a secure string generation parameter.

19. The method of claim 18,
wherein the request ruleset specifies at least a request decryption rule and a request authentication rule to validate the encrypted secure string-appended request,
wherein the response ruleset specifies at least an attribution rule, wherein the attribution rule specifies at least one selected from a group consisting of a type of an asset, a size of an asset, a content of an asset, and an identifier of an asset, and
wherein the mode of the data replication operation is a synchronous mode or an asynchronous mode.

* * * * *